US008627208B2

(12) United States Patent  
Rivas et al.

(10) Patent No.: US 8,627,208 B2  
(45) Date of Patent: Jan. 7, 2014

(54) APPLICATION GENERATOR FOR DATA TRANSFORMATION APPLICATIONS

(75) Inventors: Luis Rivas, Denver, CO (US); Mark Kreider, Arvada, CO (US); Alec Sharp, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 208 days.

(21) Appl. No.: 13/080,500

(22) Filed: Apr. 5, 2011

(65) Prior Publication Data

US 2011/0302554 A1 Dec. 8, 2011

Related U.S. Application Data

(63) Continuation of application No. 11/312,969, filed on Dec. 20, 2005, now Pat. No. 7,921,367.

(51) Int. Cl.  
*G06F 3/00* (2006.01)

(52) U.S. Cl.  
USPC ........... 715/746; 715/744; 715/762; 715/763; 715/826

(58) Field of Classification Search  
USPC .................. 715/239, 744, 746, 762, 763, 826  
See application file for complete search history.

(56) References Cited

U.S. PATENT DOCUMENTS

| | | | | |
|---|---|---|---|---|
| 5,664,206 | A * | 9/1997 | Murow et al. | 704/8 |
| 6,920,608 | B1 * | 7/2005 | Davis | 715/209 |
| 2002/0040359 | A1 * | 4/2002 | Green et al. | 707/3 |
| 2002/0073119 | A1 * | 6/2002 | Richard | 707/513 |
| 2002/0178077 | A1 * | 11/2002 | Katz et al. | 705/26 |
| 2003/0149934 | A1 * | 8/2003 | Worden | 715/513 |
| 2005/0144166 | A1 * | 6/2005 | Chapus et al. | 707/6 |
| 2005/0171970 | A1 * | 8/2005 | Ozzie et al. | 707/102 |

* cited by examiner

*Primary Examiner* — Enrique Iturralde  
(74) *Attorney, Agent, or Firm* — Marsh Fischmann & Breyfogle LLP

(57) ABSTRACT

A utility is provided for generating applications for a variety of data conversion or handling application environments. A user can use a graphical user interface to purpose application adaptable modules to define a desired application. In one implementation, the user interface (1500) includes a node tree panel (1502) and a process assembly panel (1504). The node tree panel (1502) lists tool sets (1508) including transformations, maps and input-output tools. These tools can then be assembled together with identified data sources and then elements using the assembly panel (1504) to define an application. In this manner, an application is generated from a number of generic modules simply by linking the modules to perform a purpose of the desired application. In this manner, an application is generated from a number of generic modules simply by linking the modules to perform a purpose of the desired application.

12 Claims, 18 Drawing Sheets

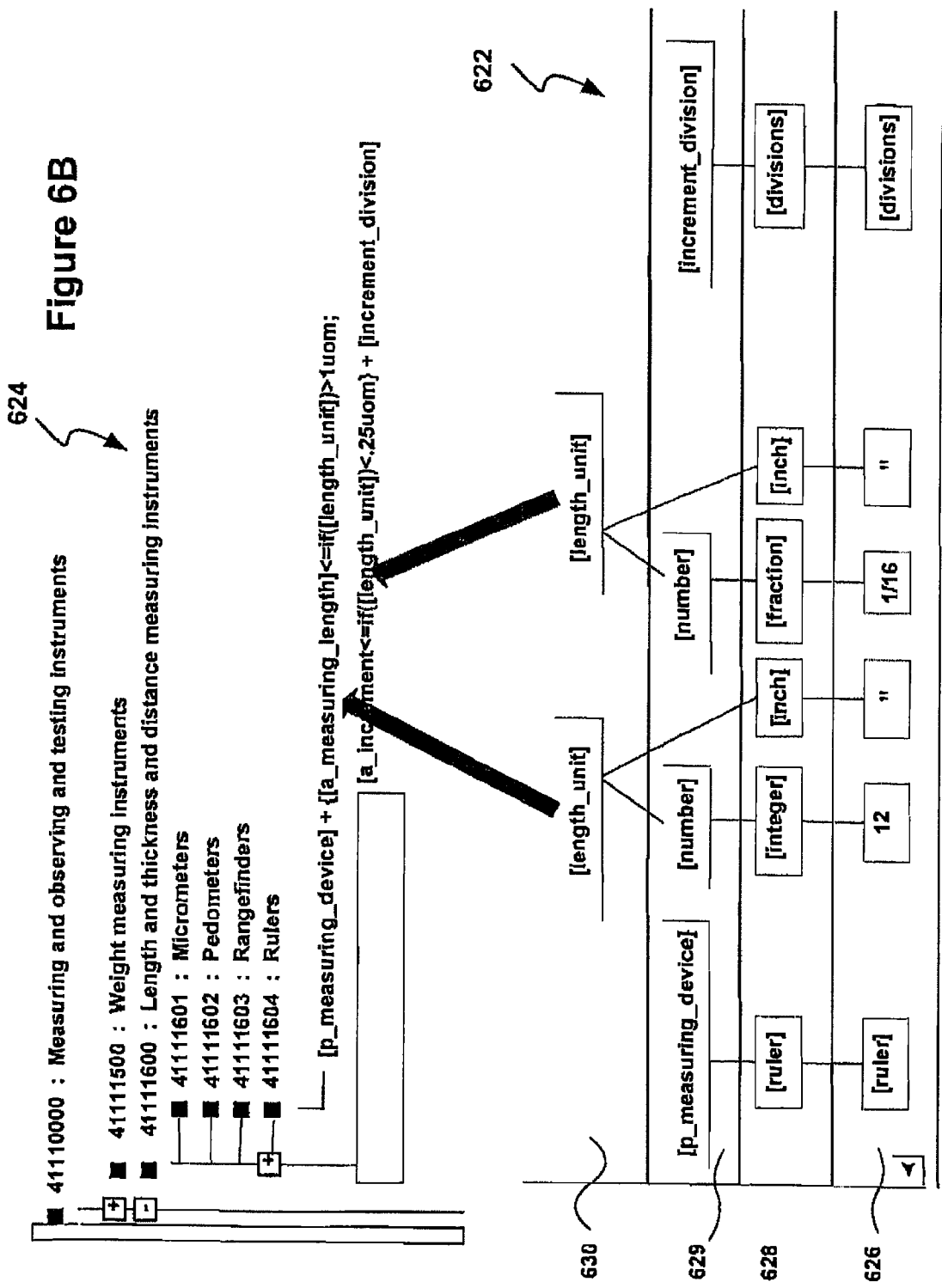

APPLICATION GENERATOR FOR DATA TRANSFORMATION APPLICATIONS

RELATED APPLICATIONS

This application claims priority to U.S. patent application Ser. No. 11/312,969, filed Dec. 20, 2005, entitled "APPLICATION GENERATOR FOR DATA TRANSFORMATION APPLICATIONS", the entirety of which is hereby incorporated by reference.

FIELD OF THE INVENTION

The present invention relates generally to software development and servicing, and, in particular, to a tool for building applications involving a data conversion from a first form to a second form using generic or application adaptable modules.

BACKGROUND OF THE INVENTION

Software applications generally are operative to perform a predefined functionality in a predefined context. For example, a database application generally allows a user to construct a structured database that can be readily populated and searched.

Early software applications had severely limited flexibility as to functionality. Routines were coded to perform a specific function on a specific type of data. If different functionality was required, a new routine had to be written. Even minor modifications of the functionality or data generally required the services of a specialist to write lines of code to address the change.

A significant advance was provided by the philosophy of object-oriented programming. This often involves significant flexibility of the functionality within a specific processing context and an abstraction of the data of interest to a metadata model. Thus, items of data or functional components may be represented as "objects" that can assume different attributes for different processing functions. In this manner, flexible processing components may be established for performing a variety of data handling functions that are commonly required for a particular application. For example, a flexible processing engine may be developed to track inventory. This may involve monitoring additions to inventory and shipments from inventory to facilitate maintenance of a desired stock level. Because the processing engine is flexible, it can be readily configured to add products to be monitored, to revise a stock level or even, perhaps, to revise the specific functionality performed within an application context, e.g., to monitor on-line orders. Ideally, this does not require that new routines be written, it merely requires that the existing objects be associated with attributes that define the new data or functionality.

While such programming represents a significant advance, it is still generally necessary to independently obtain or develop applications for each desired application objective and to undertake substantial configuration for each application environment. Thus, a business may have one application for loading data into a database, one application for handling on-line ordering, one application for inventory management, etc. Each of these applications is generally independently developed and configured for a particular application environment, with little or no transference of time and knowledge investment between the applications. From the perspective of the business, this is problematic because of the expense and other resources required to implement, coordinate and update a large number of applications. From the perspective of developers, this is problematic due to the significant maintenance and servicing requirements. This results in the common phenomenon of software development companies gravitating towards software servicing as an increasing operational emphasis.

SUMMARY OF THE INVENTION

The present invention is directed to a processing tool and related functionality (collectively, "utility") for use in generating applications for a variety of data conversion or handling application environments. In this manner, such applications can be developed to a significant extent without the services of a specialist to develop application specific code. Moreover, the invention allows for substantial reuse of knowledge as between multiple applications, thereby enhancing development efficiency and reducing opportunities for error. The invention thus entails an abstraction of functionality and data well beyond that contemplated by object oriented programming so as to provide components that adapt to define new applications, not merely to accommodate new data or new functionality within a given application context and application environment.

By way of illustration, the invention can be used to generate applications involving a data conversion from a first form to a second form. In a variety of contexts, it is desired to convert data from a first or input form to a second or target form. Such conversions may involve, for example, linguistics, syntax and formats. In this regard, linguistic differences may be due to the use of different languages or, within a single language, due to terminology, proprietary names, abbreviations, idiosyncratic phrasings or structures, misspellings and other matter that is specific to a location, region, business entity or unit, trade, organization or the like. Also within the purview of linguistic differences for present purposes are different currencies, different units of weights and measures and other systematic differences. Syntax relates to the phrasing, ordering and organization of terms as well as grammatic and other rules relating thereto. Differences in format may relate to data structures or conventions associated with a database or other application and associated tools.

One or more of these differences in form may need to be addressed in connection with a conversion process. Some examples of conversion environments include: importing data from one or more legacy systems into a target system; correlating or interpreting an external input (such as a search query) in relation to one or more defined collections of information; correlating or interpreting an external input in relation to one or more external documents, files or other sources of data; facilitating exchanges of information between systems; and translating words, phrases or documents. In all of these cases, a machine-based tool attempts to address differences in linguistics, syntax and/or formats between the input and target environments. It will be appreciated in this regard that the designations "input" and "target" are largely a matter of convenience and are process specific. That is, for example, in the context of facilitating exchanges of information between systems, which environment is the input environment and which is the target depends on which way a particular conversion is oriented and can therefore change. Many of the noted conversion processes may be broadly characterized as involving data matching, data publishing or data aggregation.

In the context of such conversion environments, a variety of applications may be desired. For example, applications may be desired to respond to requests for quotes, to create a catalog, to merge disparate databases or the like. In such business contexts, each application achieves a defined business purpose. Within a given application environment, e.g., of a business entity or unit, multiple applications may access a common body of or overlapping data. However, conventionally, such applications have generally been conceptualized as performing different and independent functionalities, e.g., a request for quote application identifies required project components and computes associated costs whereas a catalog creation application involves product grouping, formatting, etc.

In accordance with the present invention, such applications can be constructed from generic or application adaptable modules that are "purposed" for a particular application. Examples of such modules that may be used in a variety of data conversion applications include modules for "cleaning" a product description (e.g., by converting an input description into a standard form), extracting attributes from a product description (e.g., size, product type or the like), obtaining a product description from a product number, identifying particular products matching designated product attributes, etc. It will be appreciated that these modules, considered independent of a particular application context, do not achieve a business purpose. However, these modules can be combined and/or supplemented (e.g., with interface logic) to define an application. For example, an application for identifying particular products from a company database matching an input product description may involve a cleaning module (for standardizing the input description), an attribute extraction module (for identifying particular products matching the extracted attributes), together with appropriate interface logic. The modules are thus purposed to achieve a business objective. A variety of novel functionality and structure is provided in relation to such application generation.

In accordance with one aspect of the present invention, a utility is provided that allows for a selection of a module from a library of generic modules so as to construct an application. The utility involves providing a set of generic modules, selecting a module of the set of generic modules and operating a machine-based tool for purposing the selected module for use in the application under consideration. Each of the modules includes rules for use in converting data objects relating to a defined subject matter area between the first form and the second form. The modules are generic in that the rules function independent of any purpose specific to a particular application. However, upon purposing, the selected module is adapted to perform functionality related to an identified purpose of the application.

The set of generic data modules may include, for example, modules for performing individual data matching, publishing or aggregating functions. The rules may be specific to the application environment (e.g., the terminology, products or databases of a given entity) or may relate more generally to a subject matter area (e.g., a standard classification or description system of an industry). A particular module may be selected, for example, via a graphical, textual or other user interface. The machine-based tool may be operated to purpose the module, for example, by configuring the module for use in the application, by combining modules based on a desired purpose of the application, or accessing the module for configuration for use in the application. In this manner, the generic modules are readily available for use and re-use in a variety of applications.

In accordance with another aspect of the present invention, a utility is provided for at least partially automating a process for generating logic to perform an identified function with respect to a subject matter area. The utility involves identifying a subject matter of interest in relation to a desired data conversion operation and accessing a knowledge base for the subject matter area, wherein associations are established between data items of the source and target forms. A user interface allows a user to identify at least one desired function with respect to source data or target data, and a machine-based tool uses the knowledge base to generate logic for performing the identified function with respect to the subject matter area.

For example, the subject matter area of interest may be identified in relation to an industry of the user, the business of a specific entity, a desired application or a database, set of files or other stored information accessed by a user. The knowledge base may be, for example, a base developed for the user, may include information developed for other conversion application environments that is adapted for reuse, or may include conversion information of general applicability with respect to the subject matter area. The noted associations are preferably reflected in conversion rules that govern conversion of data items between the source form and the target form. By way of example, such rules may govern how input or source terms are cleaned for expression in a standardized intermediate form, how terms in an intermediate form are mapped to the target form, how a stream of data is parsed and elements thereof are identified, how syntax is recognized or constructed and conversion ambiguities are resolved, how attributes are extracted and expressed or matched to target information, and/or how input data is classified or associated with a processing frame, as will be described below.

The user interface may be provided in textual, graphic and/or another form. A number of predefined functions or functional elements may be identified in a list or a set of graphical elements for selection by the user. In this regard, the function may be simply selected or defined by specifying a relationship between functional elements. For example, the function of extracting attributes from a product description may be identified by graphically linking or otherwise defining a functional link between a description object and an attribute extraction object. A machine-based tool, such as a processing platform (embodied in one or more machines) can then use the knowledge base to generate logic, such as an application, for performing the desired function. Thus, where the knowledge base includes rules for extracting attributes and the function is selected by linking a clean product description object to an attribute extraction object, the machine-based tool may operate to configure logic for extracting product attributes from product descriptions in a clean or intermediate, standardized form. This allows the expertise reflected in a knowledge base to be leveraged to achieve a variety of functionality and applications.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION

Figure 1:
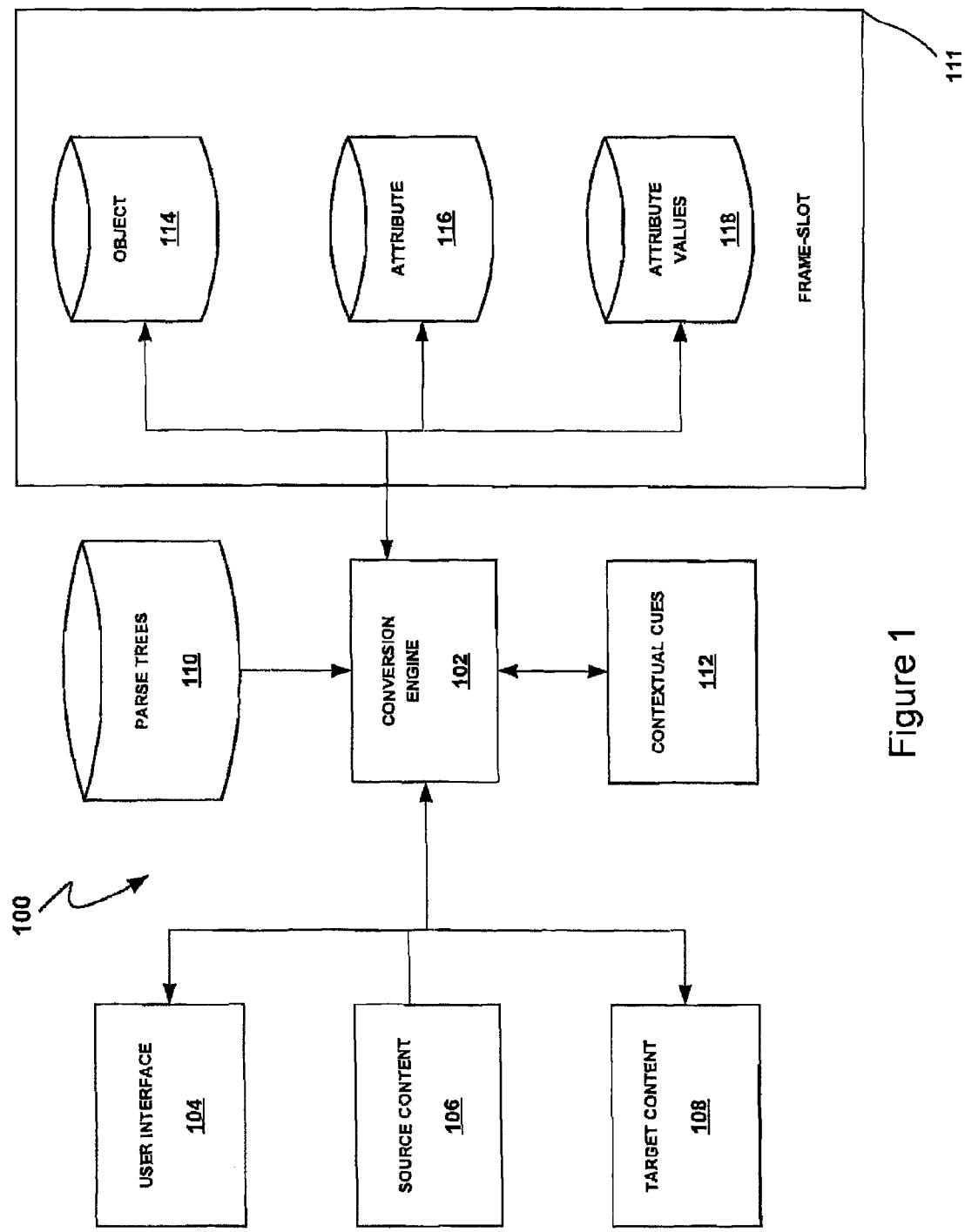
FIG. 1 is a schematic diagram of a semantic conversion system in accordance with the present invention.

The present invention relates to generating applications for a data conversion environment. Such applications generally involve converting data from a first or source form to a second or target form. As noted above, such conversions may be desired in a variety of contexts relating, for example, to importing data into or otherwise populating an information system, processing a search query, exchanging information between information systems and translation.

In many cases, these applications involve matching an input to one or more items of information (e.g., search engine applications), publishing data (e.g., generating a catalog), or aggregating data (e.g., via merging databases). Thus, while a core functionality often relates to mapping an input in a first form to one or more corresponding or related outputs, a variety of applications are thereby supported. Particular applications are described below only for purposes of illustration.

In the following description, the invention is set forth in the context of particular examples relating to processing a source stream including a product oriented attribute phrase. Such streams may include information identifying a product or product type together with a specification of one or more attributes and associated attribute values. For example, the source stream (e.g., a search query or product descriptor from a legacy information system) may include the content "8 oz. ceramic coffee cup." In this case, the product may be defined by the phrase "coffee cup" and the implicit attributes of size and material have attribute values of "8 oz." and "ceramic" respectively.

While such source streams including product oriented attribute phrases provide a useful mechanism for illustrating various aspects of the invention, and in fact represent significant commercial implementations of the invention, it should be appreciated that the invention is not limited to such environments. Indeed, it is believed that the invention is applicable to virtually any other conversion environment with concepts such as product attributes and attribute values replaced, as necessary, by logical constructs appropriate to the subject environment, e.g., part of speech and form. Moreover, as noted above, the conversion rules are not limited to elements of a single attribute phrase or analog, but may involve relationships between objects, including objects set forth in separate phrases. Accordingly, the specific examples below should be understood as exemplifying the invention and not by way of limitation.

The present invention is based in part on the recognition that a broad range of applications can be conceptualized as fundamentally involving converting data from a source form to a target form. Moreover, it has been recognized that such applications, in many cases, can be constructed from modules that can be reused in a variety of such applications. As such, these modules are abstracted from any specific application context; that is, they are substantially application adaptable. Generating an application from these modules thus involves "purposing" or "repurposing" the modules in relation to a purpose of an application under consideration, often a business purpose.

The following description begins by describing the application generation functionality at a high conceptual level. In the examples provided below, this involves assembling existing application adaptable modules. Thereafter, various functionality for developing and operating such modules is described in greater detail, including functionality relating to both parse tree and frame-slot architectures for data conversion.

Figure 15:
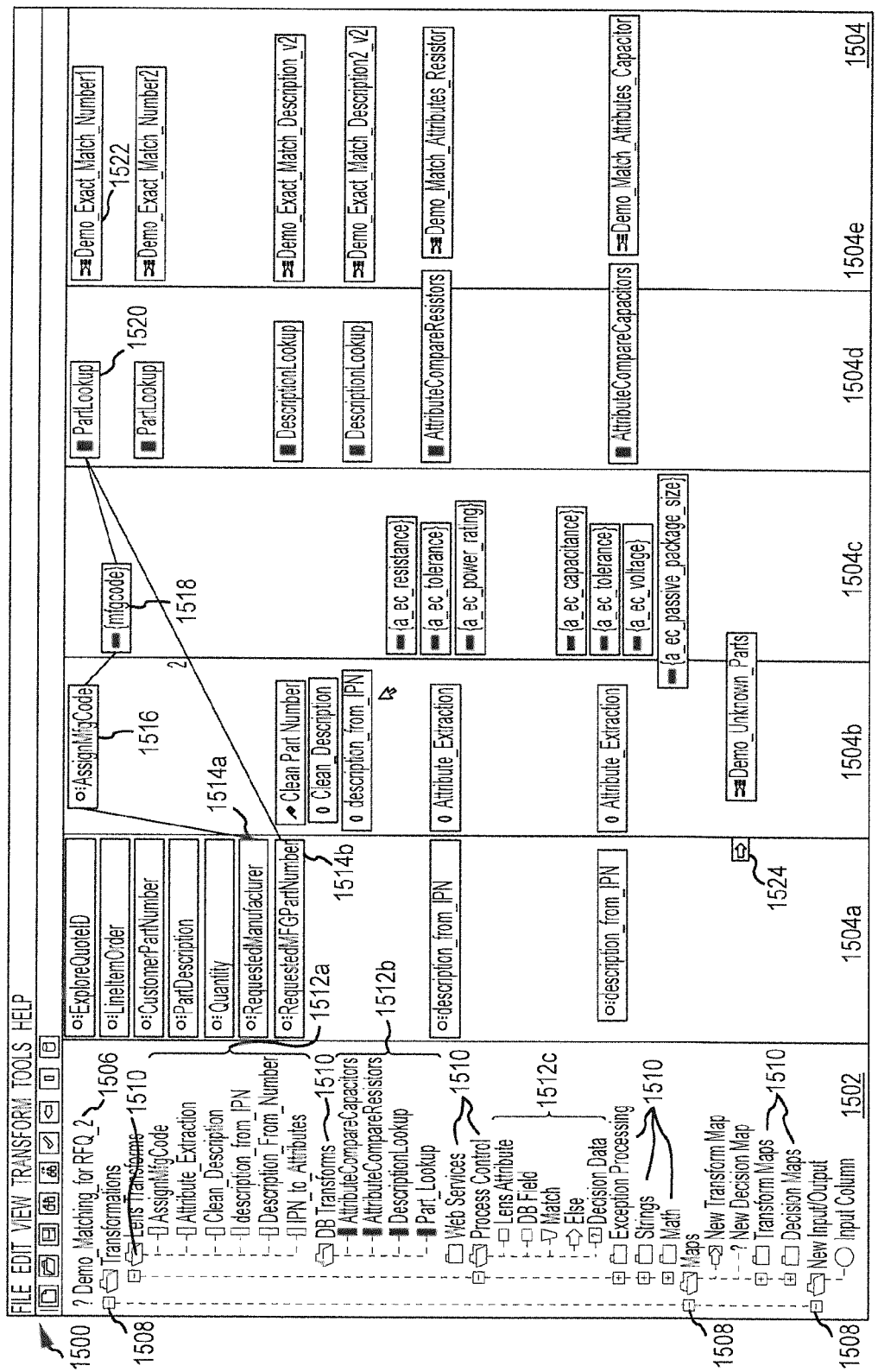
FIG. 15 illustrates a graphical user interface for use in generating an application involving a data conversion process in accordance with the present invention.

Referring first to FIG. 15, a screen shot is shown of a user interface 1500 illustrating application generation functionality in accordance with the present invention. The user interface 1500 includes a node tree panel 1502 and a process assembly panel 1504. The node tree panel 1502 provides a hierarchical listing of applications 1506, application generation tool sets 1508, tool folders 1510, and individual tools 1512. The process assembly panel 1504 provides a workspace for assembling application components and defining associated logic to define an application. As will be described in more detail below, the application components and logical interactions thereof are represented as intuitive graphical elements in panel 1504.

A user can use the interface 1500 to generate an application as follows. First, the user can access the application generation system, e.g., by loading the system on a processing platform. Various prompts may be provided to guide the user in identifying the desired application operation. In this regard, the user may identify an entity for whom the application will be developed, an industry, relevant databases, or the like. The user can select an existing application for modification or enter a new application name to initiate application generation. In the illustrated example, the application under development is identified as "Demo_Matching_for_RFQ_2," a request for quote application involving identification of parts based on matching required or desired attributes to inventory.

The processing system will then display a variety of elements 1508, 1510, 1512 in node tree form. The displayed elements 1508, 1510, 1512 may be a full listing of available elements, or intelligence may be executed in displaying elements likely to be relevant to the application. In the latter regard, such intelligence may be gleaned from responses to the noted prompts during start-up and/or may be gleaned from the application name. As will be understood from the description below, the system of the present invention is particularly well suited to matching an input application name to associated application generation elements. Indeed, this is a species of data conversion.

In the illustrated example, the panel 1502 is populated with application generation tool sets 1508 including transformations, maps and new input/output tool sets. The transformation toolset includes the transformation tool folders 1510 identified as lens transforms, database transforms, web services, process control, exception processing, strings and math. The lens transforms folder 1510, in turn, includes a number of lens tools 1512*a* each associated with a lens icon. Each of these lens tools 1512*a* embodies application adaptable logic for transforming data from a first form to a second form. For example, the illustrated lens tools 1512*a* include tools for assigning a manufacturing code (e.g., based on an input manufacturer's name or portion thereof), extracting product attributes (e.g., from a product description phrase), cleaning a product description (e.g., re-expressing an input description—entered, for example, in free form, legacy database form or other "local" form—in standardized form), extracting a product description from a part number such as an IPN, and extracting product attributes from an IPN (which may be conceptualized as a short-cut for the serial combination of obtaining a product description from an IPN and then extracting attributes from the product description). It will be appreciated that these tools 1512*a*, by themselves, do not define an application as a tool standing alone does not fulfill a business (or other) purpose. The development and operation of such tools will be described in greater detail below.

The DB transforms folder 1510 includes a number of tools 1512*b*, associated with a database icon, embodying logic for performing conversions involving accessing a designated database. These tools 1512*b* are application adaptable tools, generally analogous to the lens tools 1512*a*, except that their functionality is linked to a database or databases. In the illustrated implementation, these tools 1512*b* include tools for identifying capacitors or resistors from a database (e.g., listing inventory of an entity) that match attributes extracted from a product description and tools for looking up a part or a description from a designated database.

The web services folder 1510 includes tools for accessing the World Wide Web, for example, to receive application inputs (e.g., search queries, RFQs, etc.), output responses (e.g., search results, quotes, etc.), access conversion information (e.g., search databases, industry description/classification conventions, etc.) or other purposes. The process control folder 1510 includes tools 1512*c* for defining the logical operation of other tools 1512 (e.g., lens tools 1512*a* and database tools 1512*b*) or logical interoperation of such tools 1512 so as to achieve a purpose of the application at issue. In some cases, the tools 1512 may simply be linked to assemble an application. In other cases, it is useful to adapt the tools 1512 or specify the interoperation thereof. Thus, for example, the illustrated process control folder 1510 includes a lens attribute tool 1512*c* for adapting the operation of a lens transform tool 1512*a*. For example, a lens transform tool 1512*a* may be configured to access or point to a particular knowledge base. As described below, such knowledge bases may be developed for a specific application environment or may be re-used from another application environment with significant rule inheritance.

The illustrated process control folder 1510 further includes a database field tool 1512*c*. As noted above, the database transform tools 1512*b* execute conversions relative to particular databases. In this regard, the tools 1512*b* may be configured, for example, to point to particular databases and to understand the database structure so as to identify relevant fields. Such configuration may be implemented using the lens attribute tool 1512*c*. Predefined or custom configuration or other adaptation functionality may be supported in this regard.

The match, else and decision data tools 1512*c* define logic such as Boolean logic for further controlling the operation or interoperation of the tools, e.g., 1512*a* and 1512*b*. Thus, for example, an attribute-extraction lens tool 1512*a* may be linked to an attribute compare database tool 1512*b* via a link associated with rules for defining a "match" between attributes of a product description and attributes of a product as defined in the database. This functionality can be implemented using the match 1512*c*.

Not all logic for conversion applications is linear. In some cases, it is useful to support contingent operation (e.g., if parts by a specified manufacturer are available, fulfill request with those parts ELSE extract attributes and match to alternative parts). Process flow corresponding to such contingent operation can be implemented using the ELSE tool 1512*c*.

It will be appreciated that particular decision algorithms may vary from application-to-application. Specific algorithms in this regard, including custom algorithm for an application, can be implemented using the decision data tool 1512*c*.

The illustrated node tree further includes exception processing, strings and math folders 1510 (not opened or expanded in FIG. 15). Each of these folders 1510 may include tools for use in defining functionality relative to an application under consideration. For example, the exception processing folder 1510 may include tools for implementing procedures for dealing with inputs that are not handled by the general processing rules (e.g., where an input term is not recognized by the relevant knowledge base, the knowledge base may be expanded in accordance with defined rules). The strings folder 1510 may include tools for controlling the processing of data strings, e.g., parsing strings, defining phrases, associating metadata tags with phrase elements, etc. Many logical operations utilize mathematical constructs such as equivalence, greater than, less than, etc., for example, to compare attribute values to defined ranges. Such mathematical constructs, ranging from very simple to arbitrarily complex, can be implemented using tools from the math folder 1510.

The maps toolset 1508 is used to graphically map a process flow for an application under consideration. In the illustrated implementation, both transform maps and decision maps are supported and associated tools are included in the transform maps and decision maps folders 1510. Generally, process maps are used to graphically construct and represent the process flow at the tool level, e.g., as a series (and/or parallel) arrangement of tools for implementing a purpose of the application. Thus, transform maps are analogous to parse trees as discussed below. Decision maps are used to graphically construct and represent the process flow as a function of decisions, e.g., as a network of decisions that collectively define a purpose of an application. Decision maps may thus be conceptualized as a form of flow chart. It will be appreciated that the same process flow may be mapped as a transform map or a decision map and either map may be useful for defining or understanding the process flow depending, for example, on the user or the particular issue contemplated by the user.

The illustrated node tree further includes a new input/output toolset 1508. In the conversion application context, the various tools are operative for executing conversion functionality in relation to an input form and an output form. It may be desired to define or expand the input and output forms supported in this regard, e.g., to add or modify source or target databases or source or target data structures. Tools included or includable in the new input/output toolset 1508 allow for implementation of this functionality.

The assembly panel 1504 provides a graphical workspace for assembling tools 1512a-c to generate an application. The illustrated panel 1504 is divided into columns 1504a-e for use in defining a process flow generally from left to right, though linearity is not required or even necessarily expected. Moreover, substantially any graphical representation desired by a user may be accommodated. The columns 1504a-e are populated with files, input/output ports, tools and the like that constitute application building blocks. In this regard, the columns may be prepopulated roughly in correspondence to the structure of the node tree (e.g., for Demo_Matching_for-_RFQ_2 it may be anticipated that DB transform tools 1512b will generally operate to the right of lens transform tools 1512a) and/or the corresponding graphical elements may be dragged and dropped (or otherwise positioned) where desired. Conversely, certain changes to the structure shown in panel 1504 may be reflected in the node tree of panel 1502.

Process flows can then be defined in relation to the panel 1504 by establishing appropriate links between the graphical elements. Two examples are illustrated in FIG. 15. Specifically, the illustrated processes match certain inputs 1514a and b to part numbers in an inventory database (e.g., as an intermediate process in generating a quote). More specifically, for input 1514a which identifies a requested manufacturer for a part, the input 1514a is linked to a transformation lens tool 1516 for associating a manufacturing code with the specified manufacturer. This yields a manufacturing code 1518 that is linked to a database transform tool 1520 for mapping the request to an exact match 1522 from the inventory database. For input 1514b which identifies a manufacturing code, the input 1514b can be directly linked to the database transform tool 1520.

It will be appreciated that the links, though graphically depicted as undifferentiated connecting lines, may reflect a variety of interoperational logic as discussed above. Such logic may be exposed or defined by clicking on or otherwise selecting the connecting line of interest. If desired, different types of logical dependence may be graphically depicted in this regard, e.g., contingent links may be dashed and match or else links may be identified by appropriate icons (see, e.g., icon 1524 not in this case associated with a link).

Figure 16:
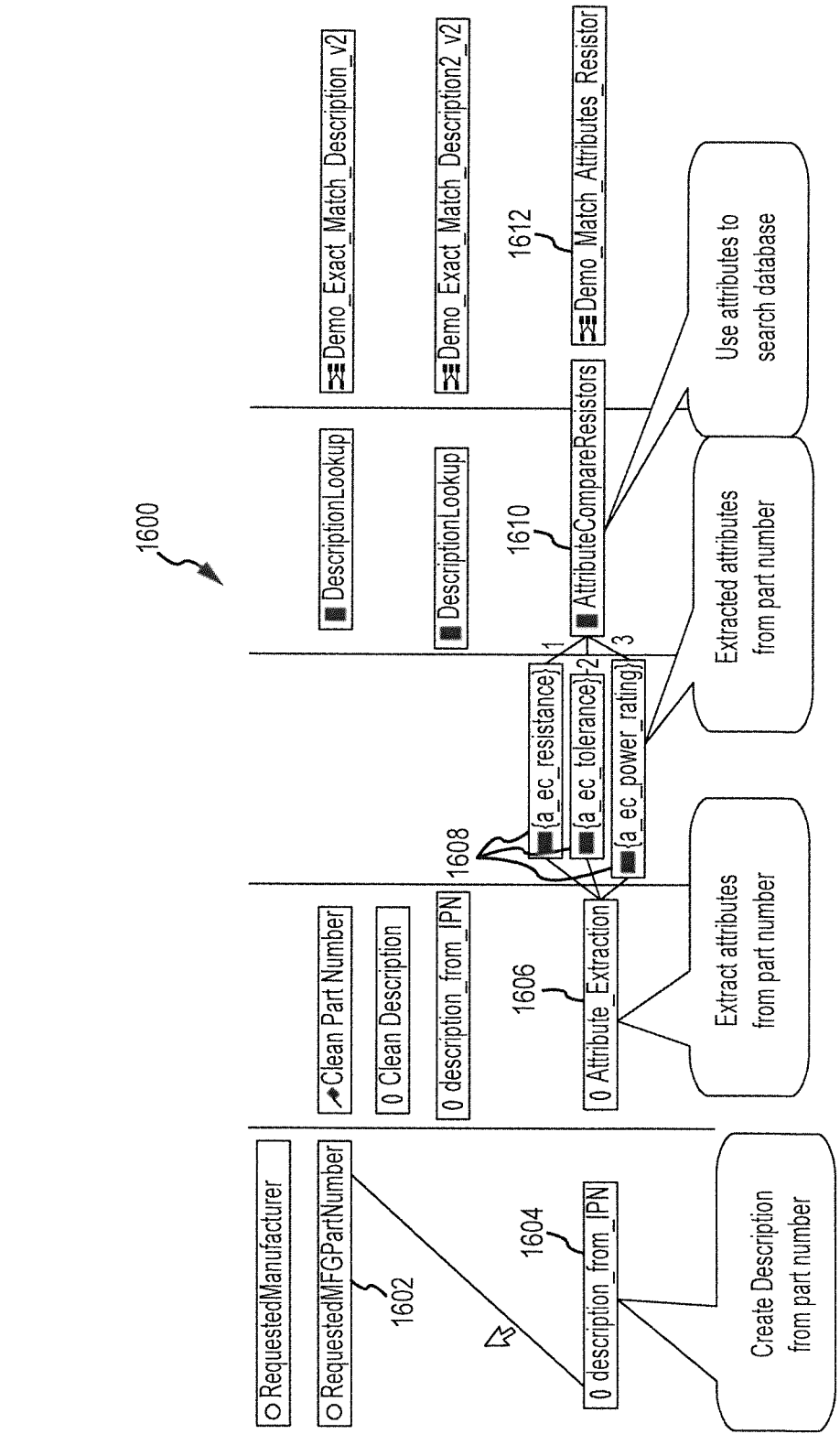
FIG. 16 illustrates a process flow implementation in accordance with the present invention.

A further example in this regard is shown in FIG. 16. Specifically, a process flow 1600 is shown for identifying an alternate part or parts corresponding to a particular part number identified in an input 1602. This may be useful, for example, where the designated part is not available or to provide other options as may be desired. In the illustrated process, the input 1602 is linked to a lens tool 1604 for extracting a description from the part number. This tool 1604 in turn is linked to a further lens tool 1606 for extracting attributes 1608 from the description output from tool 1604. These attributes 1608 are provided to a database tool that searches the designated search database to identify parts 1612 with the desired attributes 1608.

Figure 17:
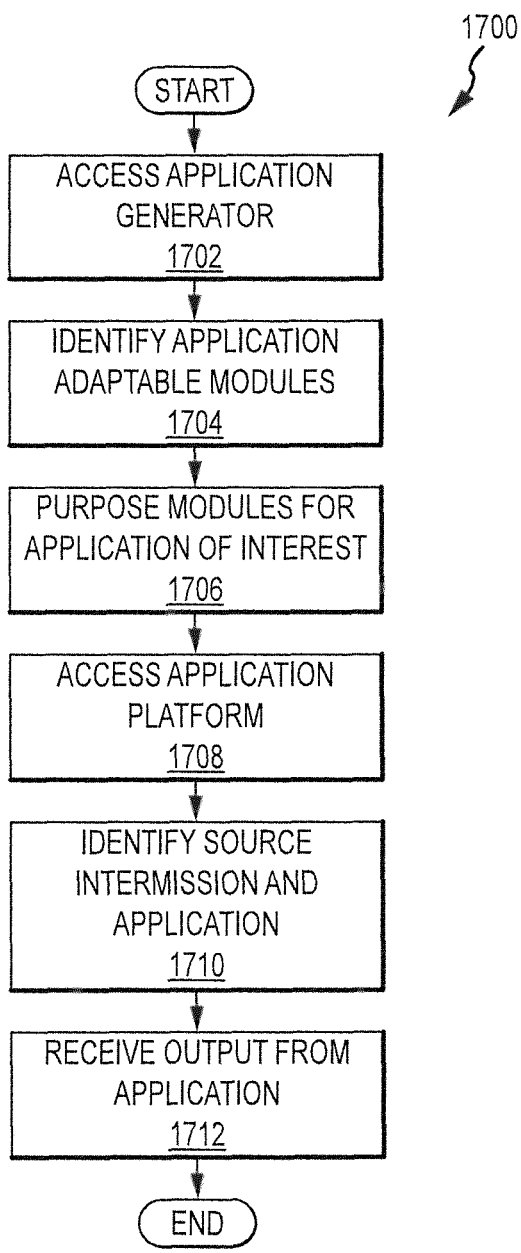
FIG. 17 is a flowchart illustrating processes for generating and using a data conversion application in accordance with the present invention.

Once an application is thereby generated, input information can be processed to achieve the purpose of the application substantially without any further instructions or code to direct the process. An associated process for generating and using an application is summarized by reference to the flowchart of FIG. 17. The illustrated process of 1700 is initiated by accessing (1702) the application generator as discussed above. For example, the application generator may run on a desktop computer, a server or other platform. Application adaptable modules can then be identified (1704) for use in the desired application. Thus, as described above, a list of existing modules such as lens transforms, database transforms, and the like may be available for selection on a graphical display. Additional modules may be imported or otherwise accessed. The modules are then purposed (1706) for the application of interest. In the implementations described above, this simply involves graphically linking the modules so that the functions of the modules collectively are adapted to the specific application environment and to achieve the purpose of the application.

A new application is thereby defined for achieving the desired purpose. This application can then be used by accessing (1708) the application platform. For example, this platform may be the same desktop computer, server, or other platform used for application generation. Source information can then be identified (1710) together with the application. For example, this may involve a graphical interface similar to that described above in connection with FIGS. 15 and 16. In this case, the newly created application may appear as a graphical element such as a lens tool. The source information in the application may be identified by graphically linking a first graphical element associated with the source information to a second element associated with the newly created application. It will be appreciated that the application may need no further instruction as to executing the desired purpose. Accordingly, the user may then automatically receive (1712) the output from the application. For example, if the purpose of the application was to search an identified database to identify parts having the same attributes as a requested part number, the application will automatically generate a list of available parts from the database. That is, without any further direction from the user other than identifying the source including the part number and the application for achieving the desired purpose, the application may extract the description from the part number, extract attributes from the description, and use the attributes to search the database.

The foregoing discussion demonstrated how process flows for achieving an objective of a desired application are implemented. In this process, certain application adaptable conversion tools are purposed for the desired application. It was assumed in this regard that such tools were available or could be developed. Moreover, reference has been made to associated knowledge bases that reflect an application environment. Associated structure and methodology for developing and operating such tools and bases will now be described in more detail. Either or both of a frame-slot architecture or a parse tree architecture may be employed in this regard.

In a preferred implementation of the invention, at least some conversions are executed with the assistance of a frame-slot architecture. Such a frame-slot architecture may function independently to define a full conversion model for a given conversion application, or may function in conjunction with one or more parse tree structures to define a conversion model. In the latter regard, the frame-slot architecture and parse tree structures may overlap with respect to subject matter.

The above-noted coffee cup example is illustrative in this regard. It may be desired to correlate the source string "8 oz. ceramic coffee cup" to a product database, electronic catalogue, web-based product information or other product listing. Such a product listing may include a variety of product types, each of which may have associated attributes and grammar rules. In this regard, the product types and attributes may be organized by one or more parse-tree structures. These parse tree structures, which are described and shown in U.S. patent application Ser. No. 10/970,372, generally organize a given subject matter into a hierarchy of classes, subclasses, etc., down to the desired level of granularity, and are useful for improving conversion accuracy and improving efficiency in building a grammar among other things. In this case, "coffee cup" may fall under a parse tree node "cups" which, in turn falls under a parent node "containers" which falls under "housewares", etc. Similarly, the same or another parse tree may group the term "oz.", or a standardized expression thereof (e.g., defined by a grammar) such as "ounce" under the node "fluid measurements" (ounce may also appear under a heading such as "weights" with appropriate grammar rules for disambiguation) which, in turn, may fall under the parent node "measurements", etc.

As noted above, such a parse tree structure has certain efficiencies in connection with conversion processes. However, in some cases, very deep parses may be required, e.g., in connection with processing terms associated with large data systems. Moreover, such terms are often processed as individual fields of data rather than closer to the whole record level, thereby potentially losing contextual cues that enhance conversion accuracy and missing opportunities to quickly identify content anomalies or implement private schema to define legal attributes or values for a given information object. Finally, such parse tree processes may impose a rigid structure that limits applicability to a specific subject matter context, thereby limiting reuse of grammar segments.

By contrast, a frame-slot architecture allows for consideration of source stream information at, or closer to, the whole record level. This enables substantial unification of ontology and syntax, e.g., collective consideration of attribute phrases, recognized by the grammar and attribute values contained therein. Moreover, this architecture allows for consideration of contextual cues, within or outside of the content to be converted or other external constraints or other external information. In the coffee cup example, the frame-slot architecture allows for consideration of the source stream "8 oz. coffee cup" in its entirety. In this regard, this stream may be recognized as an attribute phrase, having "coffee cup" as an object. Grammar rules specific to this object or a class including this object or rules of a public schema may allow for recognition that "oz." means "ounce" and "ounce" in this context is a fluid measure, not a weight measure. A user-defined schema, for example, a private schema of the source or target information owner, may limit legal quantity values associated with "ounce" in the context of coffee cups to, for example, "6", "8" and "16". In this case, recognition of "8" by the schema provides increased confidence concerning the conversion. If the value had been "12", which would not comply with the schema in this example, this might serve, for example to quickly identify an anomaly (e.g., in the case of mapping records from a legacy data system to a target system) or identify an imperfect match (e.g., in the case of a search query) so that appropriate action may be taken.

The frame-slot architecture thus encompasses a utility for recognizing stream segments, obtaining contextual cues from within or external to the stream, accessing grammar rules specific to the subject matter of the stream segment and converting the stream segment. This may avoid deep parses and allow for greater conversion confidence and accuracy. Moreover, greater grammar flexibility is enabled, thus allowing for a higher degree of potential reuse in other conversion contexts. In addition, executing such processes by reference to a schema enables improved context-related analysis. In short, conversions benefit from surrounding and external context cues in a manner analogous to human processing.

As noted above, the frame-slot architecture may be developed in a top-down or bottom-up fashion. For example, objects, associated attributes and legal attribute values may be defined as schema that are imposed on the data. In the coffee cup example, all of these may be defined based on an analysis of a product inventory or the structure of a legacy information system. In either case, the schema may dictate the legal values for quantity to 6, 8 and 16. Any information not conforming to the schema would then be identified and processed as an anomaly. Conversely, the legal values may be defined based on the data. For example, files from a legacy information system may be used to define the legal attribute values which, then, develop as a function of the input information.

FIG. 1 illustrates a system 100 for implementing such conversion processing. The illustrated system 100 includes a conversion engine 102 that is operative to execute various grammar rules and conversion rules for converting source information to a target form. In the illustrated embodiment, the system 100 is operative to execute both frame-slot architecture methodology and parse tree structure methodology. However, it will be appreciated that a frame-slot architecture may be executed in accordance with the present invention in the absence of a cooperating parse tree environment.

The illustrated grammar engine receives inputs and/or provides outputs via a workstation associated with the user interface 104. For example, in a set-up mode, a user may select terms for processing and create associated relationships and grammar rules via the user interface 104. In the context of a search system, a search query may be entered, and search results may be received, via the user interface 104. In this regard, the grammar engine 102 may be resident at the work station associated with the user interface 104, or may communicate with such a work station via a local or wide area network.

The source content 106 includes the source string to be converted. Depending on the specific application, this content 106 may come from any of a variety of sources. Thus, in the case of an application involving transferring information from one or more legacy information systems into a target information system, the source content 106 may be accessed from the legacy systems. In the case of a search engine application, the source content may be derived from a query. In other cases, the source content 106 may be obtained from a text to be translated or otherwise converted. The source content 106 may be preprocessed to facilitate conversion or may be in raw form. In the case of preprocessing, the raw content may be supplemented, for example, with markers to indicate phrase boundaries, tags to indicate context information, or other matter. Such matter may be provided in a set-up mode process. In addition, some such information may be present in a legacy system and may be used by the conversion engine 102. It will be appreciated that the sources of the content 106 and the nature thereof is substantially unlimited.

The illustrated conversion engine 102 performs a number of functions. In this regard, the engine 102 is operative to process the source content 106 to parse the content into potential objects and attributes, identify the associated attribute values, and, in some cases, recognize contextual cues and other matter additional to the content to be transformed that may be present in the source content. The engine 102 then operates to convert the relevant portion of the source content 106 using a parse tree structure 110 and/or a frame-slot architecture 111, and provides a converted output, e.g., to a user or target system.

With regard to the parse tree structure 100, such a structure is generally developed using the conversion engine 102 in a set-up mode. The nodes of the parse tree structure 110 may be defined by someone familiar with the subject matter under consideration or based on an analysis of a data set. Moreover, certain structure developed in connection with prior conversion applications may be imported to facilitate the set-up process. Such a set-up process is described in U.S. patent application Ser. No. 10/970,372, which is incorporated herein by reference. At a high level, this set-up involves defining the hierarchical structure of the tree, populating the various nodes of the tree, developing standardized terminology and syntax and associated grammar and conversion rules associated with the tree and mapping source content variants to the standardized terminology and syntax.

In the case of the frame-slot architecture 111, the conversion engine 102 obtains the source content 102 and identifies potential objects, attributes and attribute values therein. In this regard, the source content 106 may be parsed as discussed above. In addition, the engine 102 may obtain contextual cues 112 to assist in the conversion. As noted above, such cues may be internal or external to the source content 106. External cues may be based on the identity or structure of a source information system, defined by a schema specific to the frame-slot conversion, or based on information regarding the subject matter under consideration obtained from any external source. For example, information indicating that, when used in connection with "coffee cup" the term "ounce" is a fluid (not a weight) measure, may be encoded into metadata of a legacy information system, defined by a private schema developed for the subject conversion application or derived from an analysis of external information sources.

In the context of the frame-slot architecture, the conversion engine is operative to: identify potential objects, attributes and attribute values; process such information in relation to certain stored information concerning the objects, attributes and attribute values; access associated grammar and conversion rules; and convert the information from the source form to a target form. In this regard, the illustrated system 100 includes stored object information 114, stored attribute information 116 and stored attribute value information 118. This information may be defined by a public or private schema or by reference to external information regarding the subject matter under consideration. For example, the object information 114 may include a list of recognized objects for which the frame-slot architecture is applicable together with information associating the object with legal attributes and/or attribute values and other conversion rules associated with that object. The attribute information 116 may include a definition of legal attributes for the object together with information regarding associated attribute values and associated grammar and conversion rules. Finally, the attribute value information 118 may include a definition of legal attribute values for given attributes together with associated information concerning grammar and conversion rules.

Figure 2:
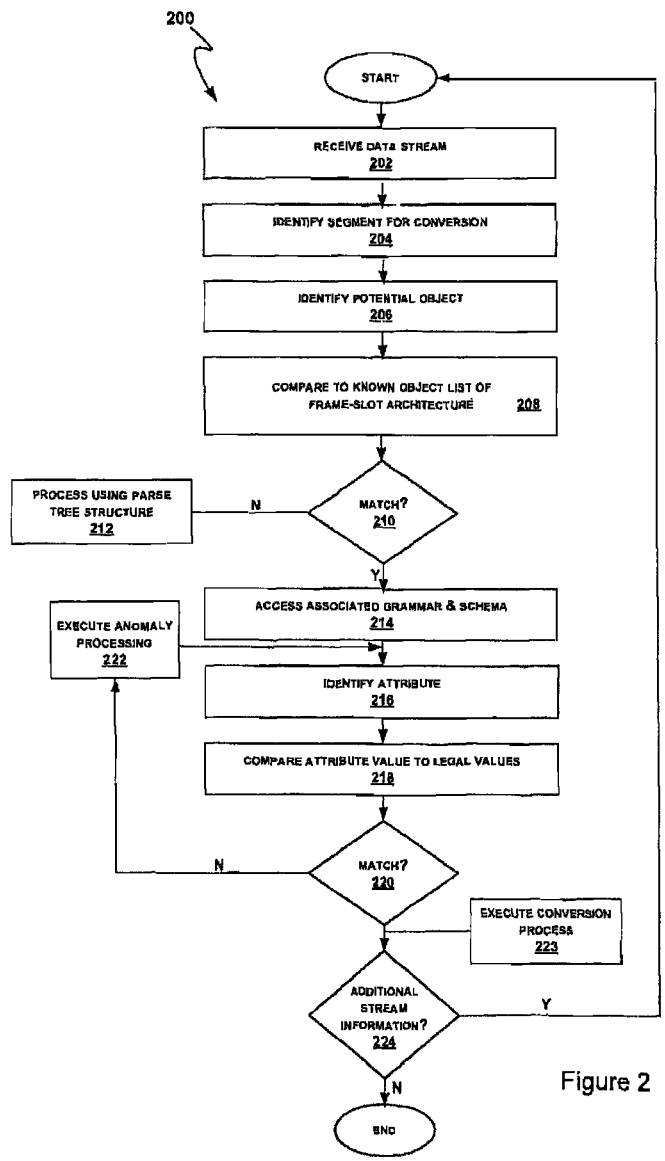
FIG. 2 is a flow chart illustrating a semantic conversion process in accordance with the present invention.

FIG. 2 shows a flow chart illustrating a process 200 that may be implemented by a conversion system such as described above. It will be appreciated that the various process steps illustrated in FIG. 2 may be combined or modified as to sequence or otherwise. Moreover, the illustrated process 200 relates to a system that executes a parse tree structure as well as a frame-slot architecture. It will be appreciated that a frame-slot architecture in accordance with the present invention may be implemented independent of any associated parse tree structure.

The illustrated process 200 is initiated by receiving (202) a data stream from a data source. Such a data stream may be entered by a user or accessed from a legacy or other information system. A segment of the data stream is then identified (204) for conversion. For example, the segment may comprise an attribute phrase or any other chunk of source data that may be usefully processed in a collective form. Such a segment may be identified as the—entirety of an input such as a search query, the entirety or a portion of a file from a legacy or other information system, or based on a prior processing step whereby phrase boundaries have been marked for purposes of conversion processing or based on logic for recognizing attribute phrases or other chunks to be coprocessed.

In the illustrated process 200 the identified segment is then processed to identify (206) a potential object within the segment. In the case of the coffee cup example above, the object may be identified as the term "cup" or "coffee cup." The potential object may be identified by comparison of individual terms to a collection of recognized objects or based on a preprocessing step wherein metadata has been associated with the source content to identify components thereof including objects. The potential object is then compared (208) to a known object list of a frame-slot architecture. As discussed above, within a given subject matter, there may be a defined subset for which frame-slot processing is possible. In the illustrated process 200, if a match (210) is identified, the system then accesses (214) an associated grammar and schema for processing in accordance with the frame-slot architecture. Otherwise, the segment is processed (212) using a parse tree structure. As a further alternative, if no object is recognized, an error message may be generated or the segment may be highlighted for set-up processing for out of vocabulary terms, e.g., so as to expand the vocabulary and associated grammar rules.

In the case of processing using the frame-slot architecture, an attribute associated with the object is then identified (216). In the coffee cup example, the terms "ceramic" or "8 oz." may be identified as reflecting attributes. Such identification may be accomplished based on grammar rules or based on metadata associated with such terms by which such terms are associated with particular attribute fields. The associated attribute values are then compared (218) to legal values. For example, the value of "8 oz." may be compared to a listing of legal values for the attribute "fluid measurement" in the context of "coffee cup." These legal values may be defined by a private schema, for example, limited to the inventory of an entity's product catalog or may be based on other external information (e.g., defining a legal word form based on part of speech). If a match is found (220) then the attribute phrase is recognized and an appropriate conversion process if executed (223) in accordance with the associated grammar and conversion rules. The process 200 then determines whether additional stream information (224) is available for processing and either processes such additional information or terminates execution.

In the case where the attribute value does not match a legal value, anomaly processing is executed (222). How anomalies are processed generally depends on the application and context. For example, if an anomaly is identified during a set-up process, the anomalous attribute value may be verified and added to the legal values listing. For example, in the coffee cup example, if the attribute value is "12 oz." and that value does not match a previously defined legal value but, in fact, represents a valid inventory entry, the term "12 oz." (or a standardized version thereof) may be added to the legal values list for the attribute "fluid measurement" in the context of "coffee cup."

Alternatively, further processing may indicate that the attribute value is incorrect. For example, if the attribute value was "6 pack," an error in parsing may be indicated. In this case, an appropriate error message may be generated or the segment may be reprocessed to associate an alternate attribute type, e.g., "object quantity," with the term under consideration.

In other contexts, different anomaly processing may be executed. For example, in the case of processing a search query, illegal values may be ignored or closest match algorithms may be executed. Thus, in the case of a query directed to a "12 oz. coffee cup," search results may be generated or a link may be executed relative to inventory related to coffee cups in general or to 8 and 16 oz. coffee cups. It will be appreciated that many other types of anomaly processing are possible in accordance with the present invention.

Figure 4:
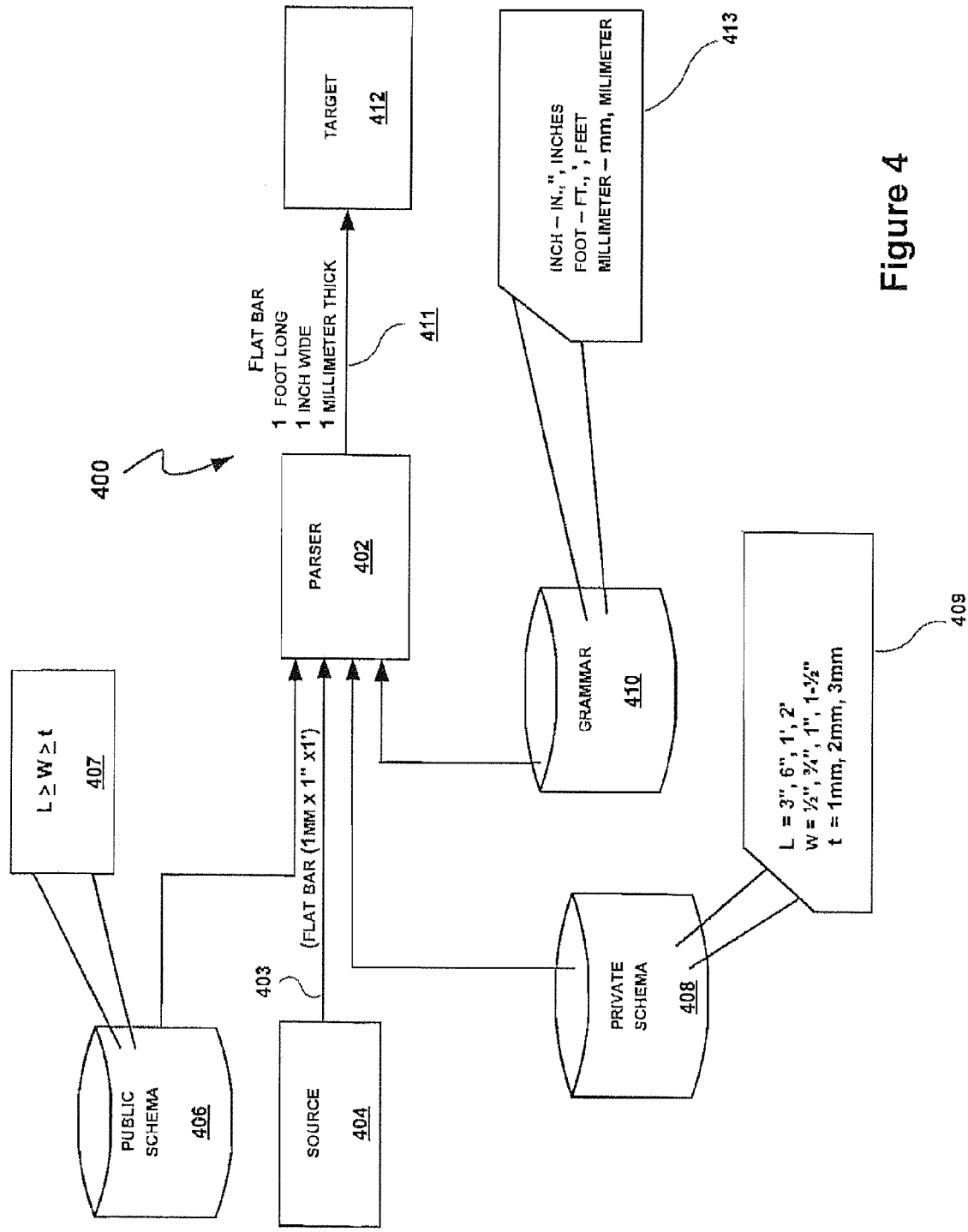
FIG. 4 is a schematic diagram illustrating the use of public and private schema in a conversion process in accordance with the present invention.
Figure 5:
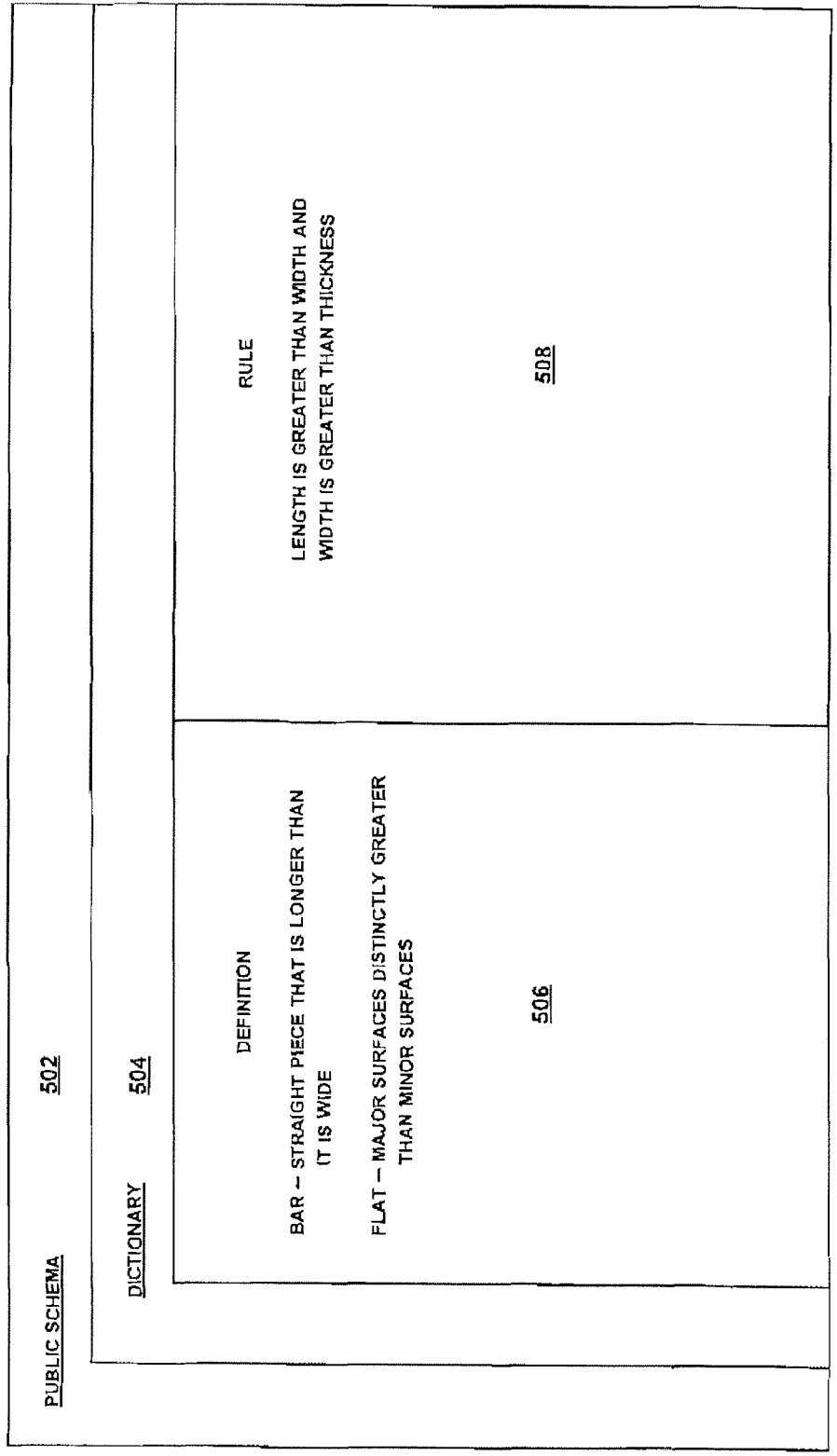
FIGS. 5-6B illustrate exemplary user interfaces in accordance with the present invention.

In the above examples, the conversion system can implement both a frame-slot architecture and a parse tree structure. This architecture and structure will now be described in more detail. Referring first to FIG. 4, a schematic diagram of a conversion system 400 in accordance with the present invention is shown. The illustrated conversion system 400 includes a parser 402 for use in parsing and converting an input stream 403 from a source 404 to provide an output stream 411 in a form for use by a target system 412. In this case, the source stream 403 includes the content "flat bar (1 mm×1"×1')." To accomplish the desired conversion, the parser 402 uses information from a public schema 406, a private schema 408 and a grammar 410. The public schema 406 may include any of various types of information that is generally applicable to the subject matter and is not specific to any entity or group of entities. In this regard, FIG. 5 illustrates an example structure 500 showing how public information related to the subject matter area may be used to define a conversion rule. As shown, a new structure 500 includes a dictionary 504 that forms a portion of the public schema 502. Panel 506 shows definitions related to the object "flat bar." Specifically, "bar" is defined as "straight piece that is longer than it is wide" and "flat" is defined as including "major surfaces distinctly greater than minor surfaces." Such definitions may be obtained from, for example, a general purpose dictionary, a dictionary specific to the subject matter, a subject matter expert or any other suitable source. These definitions are translated to define a rule as shown in panel 508. Specifically, the associated rule indicates that "length is greater than width and width is greater than thickness." This rule may then be written into the logic of a machine-based conversion tool. Referring again to FIG. 4, this rule is reflected in file 407 of public schema 406.

Figure 6A:
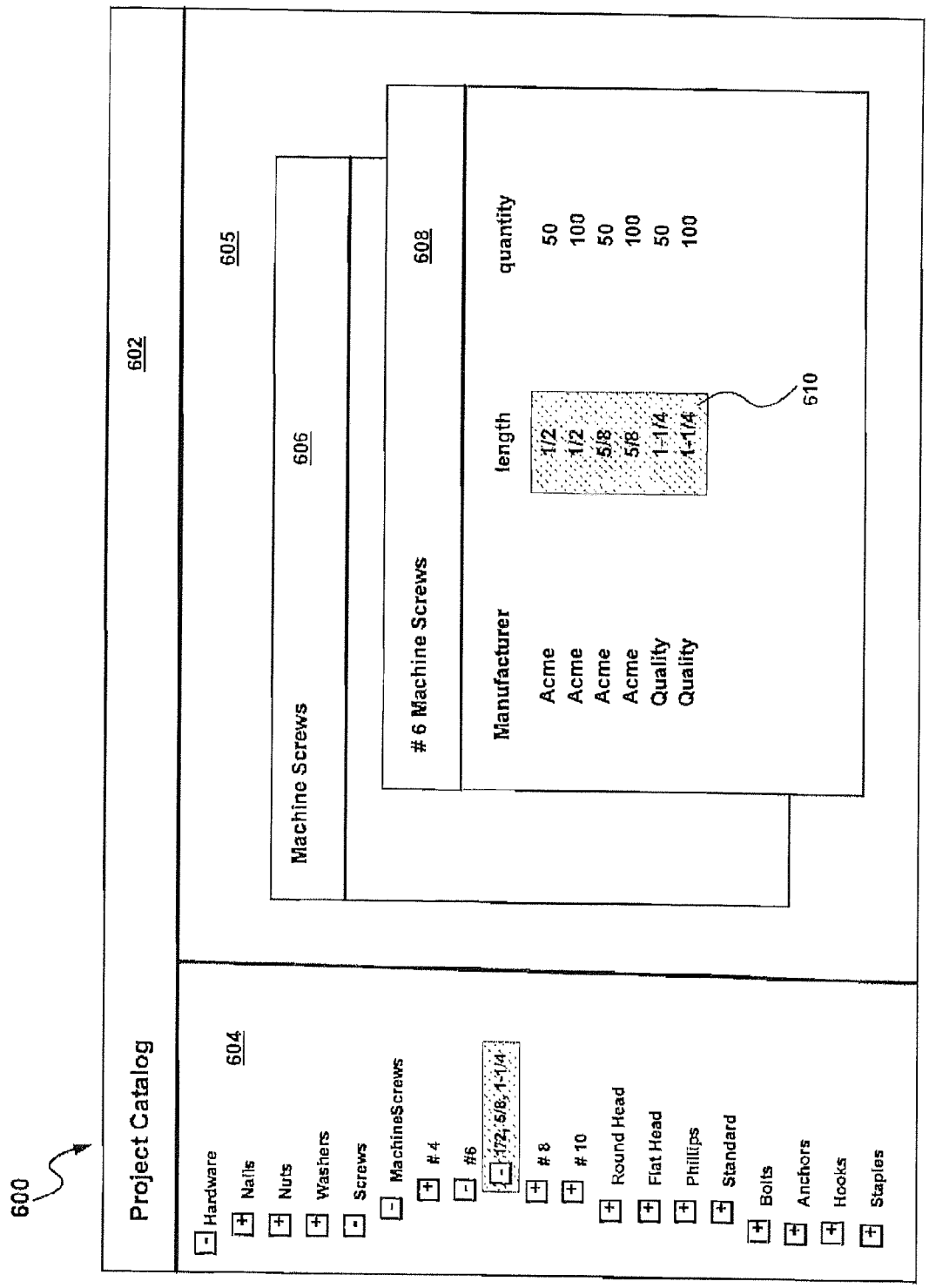

The parser 402 also receives input information from private schema 408 in the illustrated example. The private schema 408 may include conversion rules that are specific to an entity or group of entities less than the public as a whole. For example, the private schema 408 may define legal values for a given attribute based on a catalog or inventory of an interested entity such as an entity associated with the target system 412. An associated user interface 600 is shown in FIG. 6A. For example, the user interface 600 may be used in a start-up mode to populate the legal values for a given attribute. In this case, the user interface is associated with a particular project 602 such as assembling an electronic catalog. The illustrated user interface 600 includes a data structure panel 604, in this case reflecting a parse-tree structure and a frame-slot structure. The interface 600 further includes a private schema panel 605. In this case, the private schema panel 605 includes a number of windows 606 and 608 that define a product inventory of a target company. In this case, a length field 610 associated with a table for #6 machine screws is used to define legal attribute value 612 at a node of panel 604 corresponding to attribute values for #6 machine screws. Associated legal value information is shown as a file 409 of the private schema 408 in FIG. 4.

A further example of user interface segments 620 is shown in FIG. 6B Specifically, FIG. 6B shows a parse tree graphics panel 622 and a parse tree node map panel 624. For purposes of illustration, these panes 622 and 624 are shown in a stacked arrangement. However, it should be appreciated that the panels 622 and 624 may be otherwise arranged on a user interface screen or provided on separate screens. Panel 622 shows a parse tree for a particular product descriptor. In this case, the product descriptor is shown at the base level 626 of the parse tree as "ruler 12" 1/16" divisions." Layers 628-630 show patent nodes of the parse tree. Of particular interest, both of the chunks "12"" and "1/16"" are associated with the high level node "[length_unit]" reflecting the recognition by a parse tool that each of these chunks indicates a measure of length.

If the parse tree structure went no deeper, and there was not frame-slot logic available, these two length measures would present an ambiguity. However, human reader would readily recognize that, in the context of rulers, "12"" likely represents the overall length of the ruler and "1/16"" most likely represents measurement increments. In the case of a frame-slot architecture, such logic can be captured by a rule that enables the parse tool to recognize and apply such context cues to provide accurate interpretations without deep parses.

In this case, such a rule is reflected within the parse tree node map of panel 624. Specifically, a rule for interpreting "length unit" designations in the context of rulers (and, perhaps, other length measuring devices) is encoded under the "ruler" node. As shown, the rule interprets a given "length unit" as indicating "a measuring length" if the associated attribute value is greater than 1 unit of measure (uom) and treats the "length unit" as indicating an "increment" if the associated attribute value is less than 0.25 uom. This provides a certain and structurally efficient mechanism for disambiguating and converting length units in this context. Moreover, it is anticipated that such rules will be reusable in other contexts within a project (e.g., for tape measures or straight edges) and in other projects.

Grammar 410 also provides information to the parser 402. The grammar may provide any of various information defining a lexicon, syntax and an ontology for the conversion process. In this regard, the grammar may involve definition of standardized terminology described in U.S. patent application Ser. No. 10/970,372. Thus, in the illustrated example, file 413 associates the standardized terms "inch," "foot," and "millimeter" with various alternate forms thereof.

The parser 402 can then use the input from the public schema 406, private schema 408 and grammar 410 to interpret the input stream 403 to provide an output stream 411 to the target 412. In this case, the noted input stream 403 is interpreted as "flat bar-1' long, 1" wide and 1 mm thick.

Figure 3:
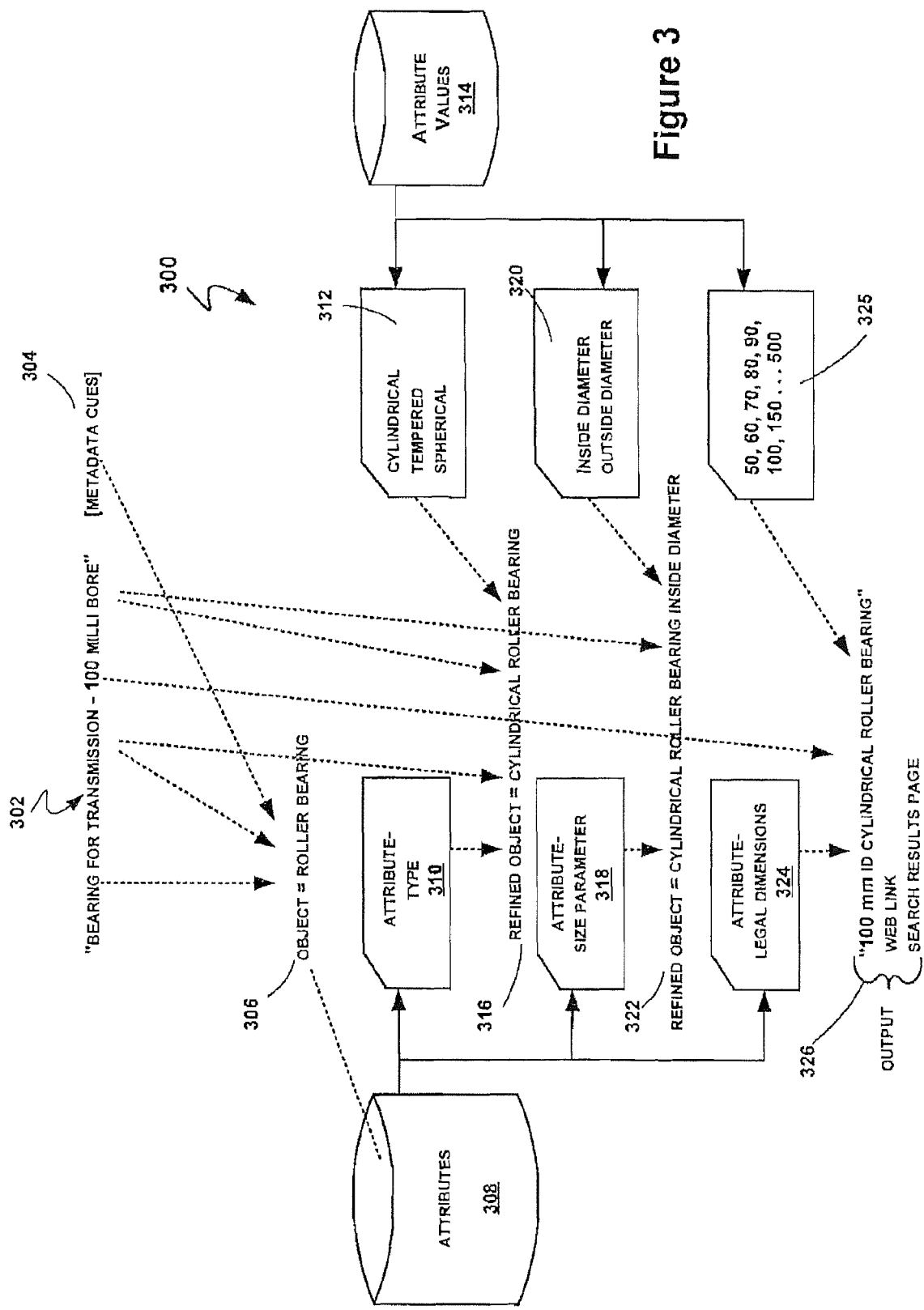
FIG. 3 is a schematic diagram showing an example of a conversion that may be implemented using the system of FIG. 1.

Referring to FIG. 3, a further example related to a frame-slot architecture 300 is illustrated. The architecture 300 is used to process a source stream 302, in this case, "bearings for transmission-100 milli. bore." For example, this source stream may be a record from a legacy information system or a search query. As discussed above, the processing of this source stream 302 may utilize various contextual cues. As will be discussed in more detail below, such contextual cues may be derived from the content of the source stream 302 itself. However, it is also noted that certain metadata cues 304 may be included in connection with the source stream 302. In this regard, it is noted that legacy information systems such as databases may include a significant amount of structure that can be leveraged in accordance with the present invention. Such structure may be provided in the form of links of relational databases or similar tags or hooks that define data relationships. Such contextual information, which can vary substantially in form, is generally referred to herein as metadata.

The frame-slot architecture 300 is utilized to identify an object 306 from the source stream 302. As noted above, this may involve identifying a term within the stream 302 and comparing the term to a list of recognized objects or otherwise using logic to associate an input term with a recognized object. It will be noted in this regard that some degree of standardization or conversion, which may involve the use contextual information, may be performed in this regard. Thus, in the illustrated example, the identified object "roller bearing" does not literally correspond to any particular segment of the stream 302. Rather, the object "roller bearing" is recognized from the term "bearing" from the stream 302 together with contextual cues provided by the term "transmission" included within the content of the stream 302 and, perhaps, from metadata cues 304. Other sources including external sources of information regarding bearings may be utilized in this regard by logic for matching the stream 302 to the object 306.

Based on the object 306, information regarding attributes 308 and attribute values 314 may be accessed. As discussed above, such information may be derived from public and private schema. For example, an attribute type 310 may be identified for the object 306 and corresponding legal attribute values 312 may be determined. In this case, one attribute associated with the object "roller bearing" is "type" that has legal values of "cylindrical, tapered and spherical." The stream 302 may be processed using this information to determine a refined object 316. In this case, the refined object is determined to be "cylindrical roller bearing." Again, it will be noted that this refined object 316 is not literally derived from the stream 302 but rather, in the illustrated example, is determined based on certain contextual information and certain conversion processes. Thus, the stream 302 is determined to match the attribute value "cylindrical" based on contextual information related to the terms "transmission" and "bore" included within the content of the source stream 302. Information regarding the attributes 308 and attribute values 314 may again be accessed based on this refined object 316 to obtain further attributes 318 and associated attribute values 320. It should be noted that these attributes and attribute values 318 and 320, though illustrated as being dependent on the attribute 310 and attribute value 312 may alternatively be independent attributes and attribute values associated with the object 306. However, in the illustrated example, the attribute "size parameter" is associated with the legal values "inside diameter" and "outside diameter" based on the refined object "cylindrical roller bearings."

In this case, the attribute 318 and attribute value 320 are used together with certain contextual cues to define a further refined object 322. In this case, the further refined object 322 is defined as "cylindrical roller bearing inside diameter." A selection between the legal value "inside diameter" and "outside diameter" is made based on contextual information provided by the term "bore" included within the content of the stream 302. Based on this further refined object 322, information regarding the attributes 308 and attribute values 314 can be used to identify a further attribute 324 and associated legal values 325. In this case, the attribute 324 is "legal dimensions" and associated legal values 325 are defined as "50, 60, 70, 80, 90, 100, 150 . . . 500." These values are assumed for the purposes of this example to be given in millimeters. In this case, the input stream 302 is processed in view of the attribute 324 and legal values 325 to define an output 326 identified as "100 mm ID cylindrical roller bearings." In this regard, the stream term "100 milli." is found to match the legal value of "100" for the attribute "legal dimensions" in the context of cylindrical roller bearings inside diameter. It will be appreciated that the term "milli." has thus been matched, based on a standardization or conversion process, to the designation "mm." It should be noted in this regard that success in matching the source term "100 milli." to the legal value "100 mm" provides further confidence was correctly and accurately performed.

Various types of outputs reflecting various conversion applications may be provided in this regard. Thus, in the case of converting an input file from a legacy database to an output form of a target information system, the input stream 302 may be rewritten as "100 mm ID cylindrical roller bearing." In the case where the source stream 302 represents a search query, the output may be provided by way of linking the user to an appropriate web page or including associated information in a search results page. It will be appreciated that other types of output may be provided in other conversion environments.

As noted above, the present invention may also implement a parse tree structure for conversion processes. Such conversion processes may relate, for example, to search systems or other information transformation systems as will be described below. Generally, such a search system may be operable in two modes: the set-up mode and the use mode. In the set-up mode, the user, who may be a subject matter expert or layman, performs a number of functions including accessing lists of potential search terms and/or source terms, developing a standardized set or set of terms, establishing a classification structure, associating the standardized terms with the classification structure and selectively transforming (e.g., translating) the terms as necessary.

Figure 7:
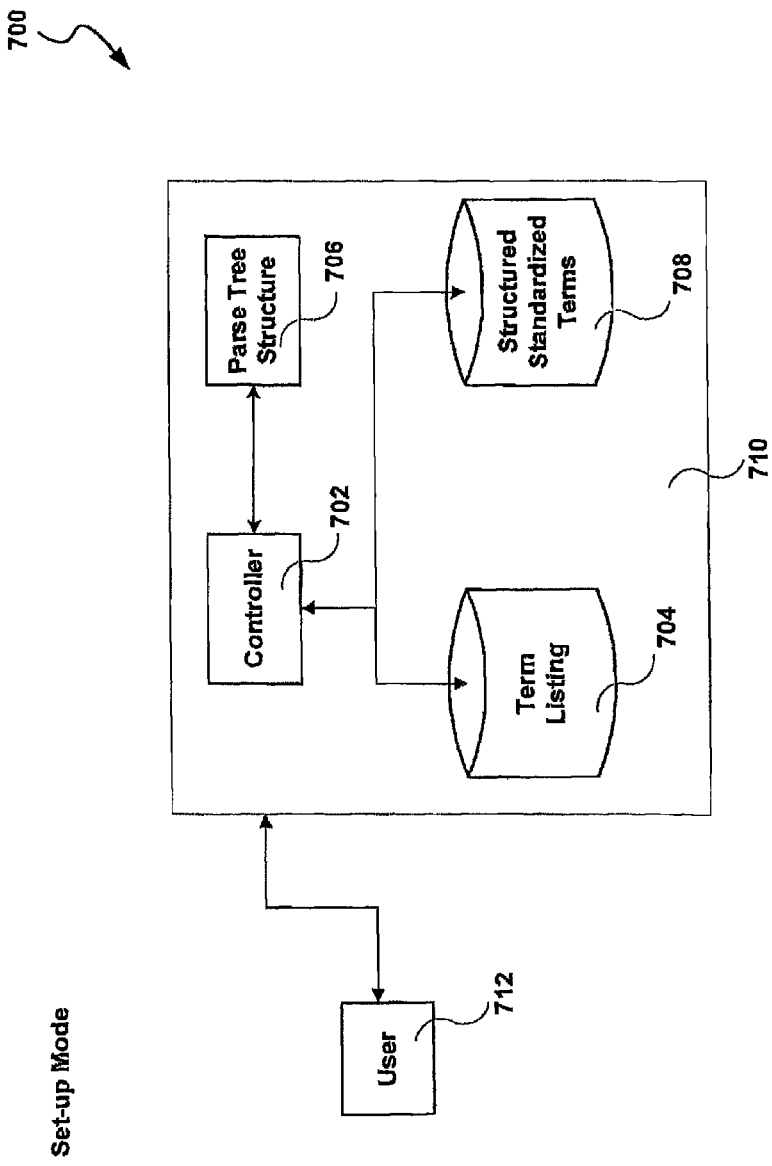
FIG. 7 is a schematic diagram illustrating set-up mode operation of a system in accordance with the present invention.

FIG. 7 is a schematic diagram of a search system 700, in accordance with the present invention, operating in the startup mode. Generally, the system 700 includes a controller 702 and storage configured to store a term listing 704, a parse tree structure 706 and a set of structured standardized terms 708. Although the system 3700 is illustrated as being implemented on a single platform 710, it will be appreciated that the functionality of the system 700 may be distributed over multiple platforms, for example, interconnected by a local or wide area network.

The user 712 uses the controller 702 to access a previously developed parse tree structure 706 or to develop the structure 706. In this regard, the parse tree structure 706 generally defines a number of classifications, each generally including one or more sub-classifications that collectively define the subject matter area. Examples will be provided below. The number of layers of classifications and sub-classifications will generally be determined by the user 712 and is dependent on the nature of the subject matter. In many cases, many such classifications will be available, for example, corresponding to headings and subheadings of a catalog or other pre-existing subdivisions of a subject matter of interest. In other cases, the subject matter expert may develop the classifications and sub-classifications based on an analysis of the subject matter.

The user can then use the controller 702 to access a term listing 704 to be processed. As noted above, such a term listing 704 may include potential search terms, source terms from a source data collection or both. In the case of potential search terms, the terms may be obtained from a pre-existing list or may be developed by the user 712. For example, the potential search terms may be drawn from a stored collection of search terms entered by users in the context of the subject matter of interest. Additional sources may be available, in a variety of contexts, for example, lists that have been developed in connection with administering a pay-per-click search engine. The list may be updated over time based on monitoring search requests. Similarly, the source term listing may be previously developed or may be developed by the user 712.

For example, in the context of online shopping applications, the source listing may be drawn from an electronic product catalog or other product database.

After accessing the term listing, the user may perform a number of functions including standardization and classification. Standardization refers to mapping of terms from the term listing 704 to a second set, generally a smaller set, of standardized terms. In this manner, misspellings, abbreviations, colloquial terms, synonyms, different linguistic/syntax conventions of multiple legacy systems and other idiosyncratic matter can be addressed such that the list of standardized terms is substantially reduced in relation to the original term listing 704. It will be appreciated from the discussion below that such standardization facilitates execution of the searching functionality as well as transformation functions as may be desired in some contexts, e.g., translation.

The resulting list of standardized terms can then be mapped to the parse tree structure 706. As will be described below, this can be executed via a simple drag and drop operation on a graphical user interface. Thus, an item from a source listing, for example, identifying a particular Post-it note product, may be associated with an appropriate base level classification, for example, "Adhesive Notepad." Similarly, a term from a potential search term listing such as "Sticky Pad" may be associated with the same base level classification. It will be appreciated that a given term may be associated with more than one base level classification, a given base level classification may be associated with more than one parent classification, etc.

As noted above, such a base level classification may be associated with a parent classification, grandparent classification, etc. All of these relationships are inherited when the term under consideration is associated with a base level classification. The result is that the standardized term is associated with a string of classes and sub-classes of the parse tree structure 3706. For example, these relationships may be reflected in an XML tag system or other metadata representation associated with the term. The resulting structured standardized terms are then stored in a storage structure 3708 such as a database.

It will thus be appreciated that, in the illustrated embodiment, both source terms and potential search terms may be mapped to elements of the same parse tree structure. This is shown in FIG. 88. As shown, multiple terms 802 from the source collection are mapped to the parse tree structure 800. Similarly, multiple terms from the potential search term listing 804 are mapped to corresponding elements of the parse tree structure 800. In this manner, a particular search term entered by a user can be used to identify responsive information from the source collection based on a common classification or sub-classification despite the absence of any overlap between the entered search term and the corresponding items from the source collection. It will be appreciated that it may be desirable to link a given term 802 or 804 with more than one classification or classification lineage of the parse tree 800. This may have particular benefits in connection with matching a particular product or product category to multiple potential search strategies, e.g., mapping "pen" to searches including "writing instrument" or "office gift."

Figure 9:
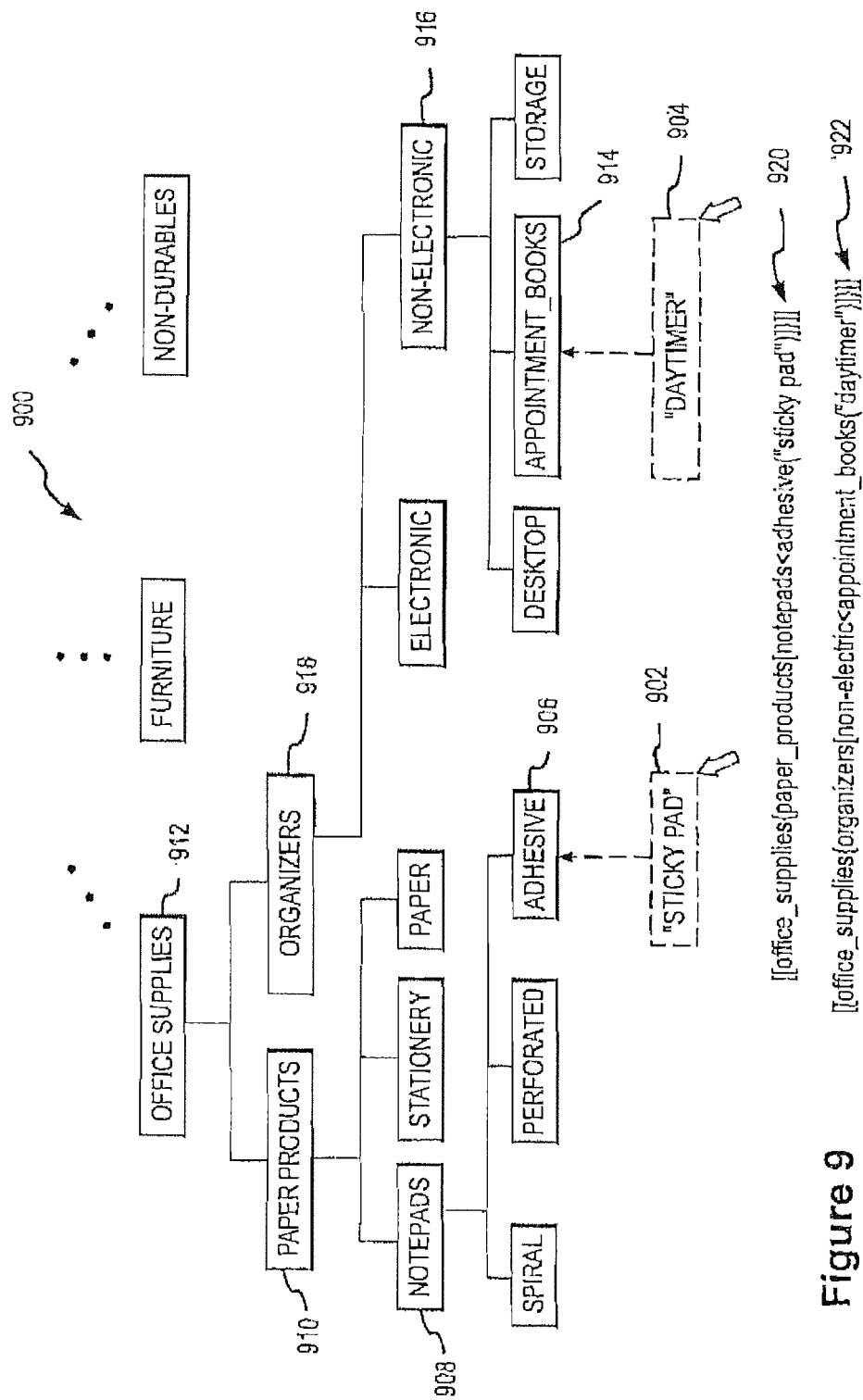
FIGS. 9 and 10 illustrate a classification system in accordance with the present invention.

An example of this process is shown in FIG. 9 with respect to particular search terms. In particular, FIG. 9 shows a user interface representing a portion of a parse tree 900 for a particular subject matter such as the electronic catalog of an office supply warehouse. In this case, the user uses the graphical user interface to establish an association between search terms 902 and 904 and the parse tree 900. Specifically, search term 902, in this case "sticky pad" is dragged and dropped on the node 906 of the parse tree 900 labeled "Adhesive." This node 906 or classification is a sub-classification of "Notepads" 908 which is a sub-classification of "Paper Products" 910 which, finally, is a sub-classification of "Office_Supplies" 912. Similarly, term 904, in this case "Daytimer," is associated with classification "Appointment_Books which is a sub-classification of "Non-electronic" 916 which, in turn, is a sub-classification of "Organizers" 918 which, finally, is a sub-classification of "Office_Supplies" 3912. Data strings 920 and 922 illustrate the resulting structured terms reflecting the classification relationships (other syntax, such as standard XML tag syntax, may be used to reflect the classification structure). It will be appreciated that the example of FIG. 9 omits the optional step of term standardization. That is, the potential search term "Sticky Pad" may alternatively first be mapped to a standardized term such as "Post-it note" before being associated with the parse tree. Such standardization will be described in more detail below.

Figure 10:
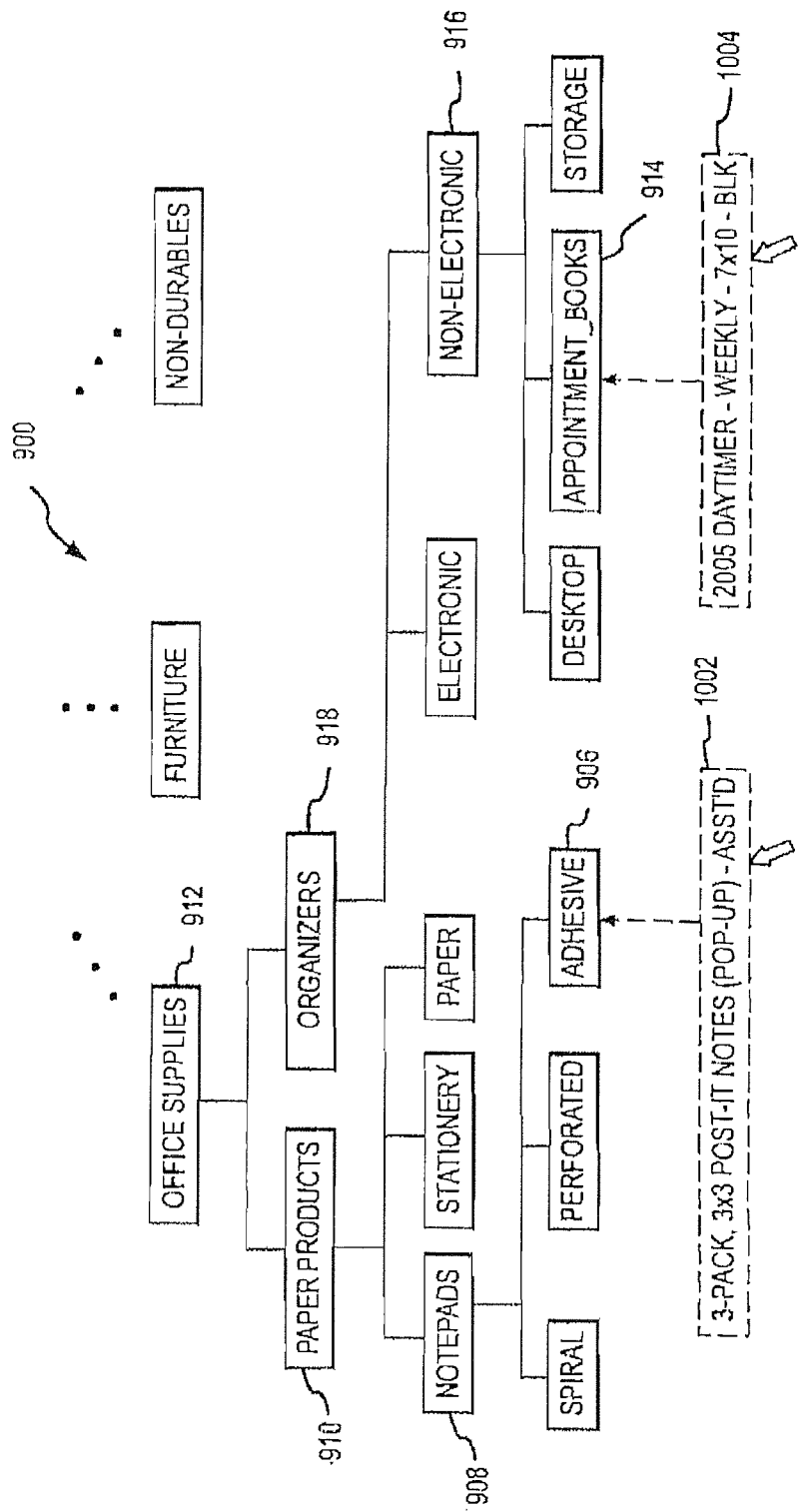

FIG. 10 illustrates how the same parse tree 900 may be used to associate a classification with items from a source collection. For example, such a source collection may be drawn from an electronic catalog or other database of the business. In this case, the source term 1002 denoted "3-pack, 3×3 Post-it notes (Pop-up)-Asst'd" is associated with the same node 906 as "Sticky Pad" was in the previous example. Similarly, term 1004 denoted "2005 Daytimer-Weekly-7×10-Blk" is associated with the same node 914 as potential search term "Daytimer" was in the previous example. As will be appreciated from the discussion below, such common associations with respect to the parse tree 900 facilitate searching.

Figure 11:
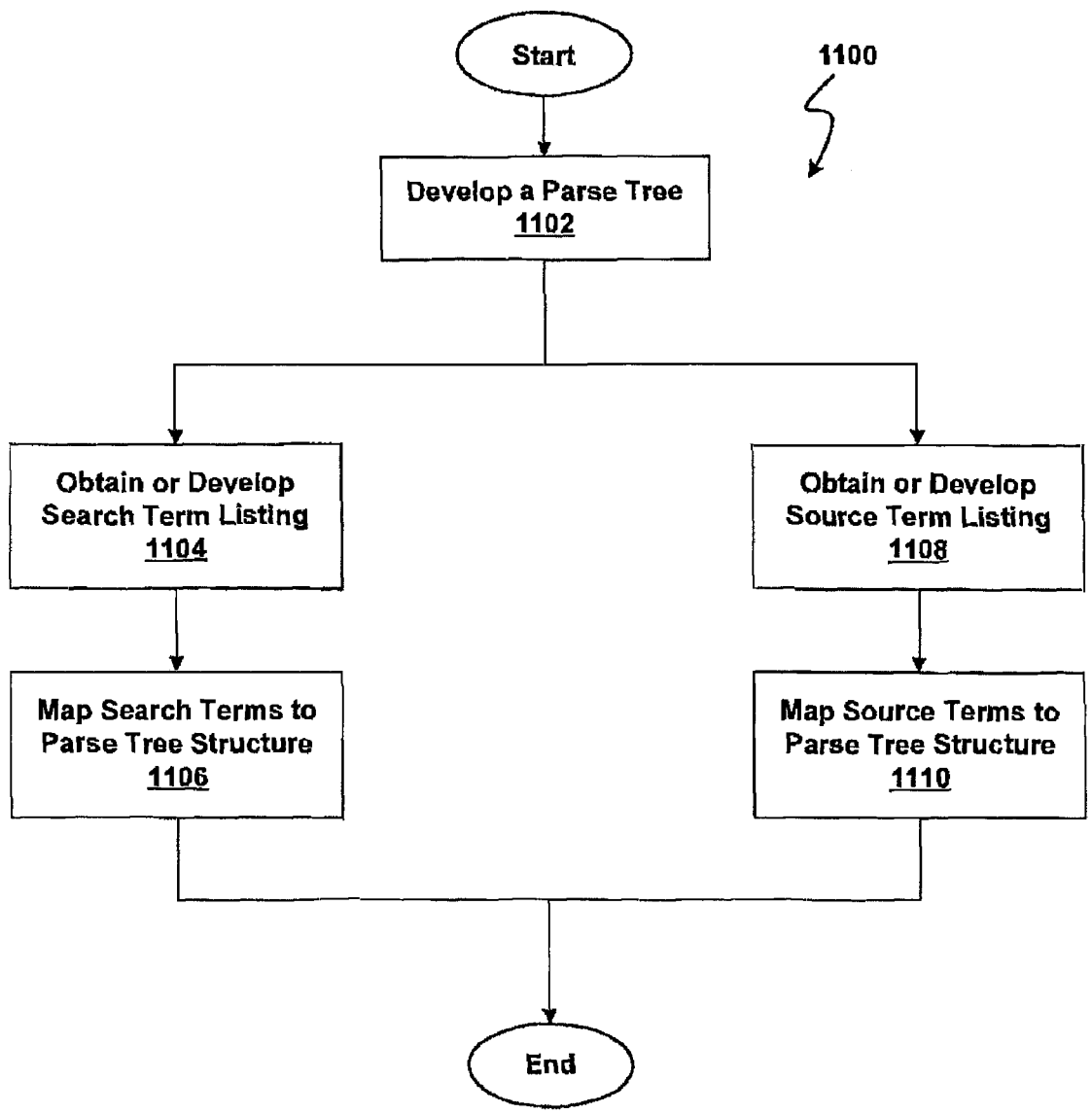
FIG. 11 is a flow chart illustrating a process for establishing a parse tree structure in accordance with the present invention.

This process for establishing a knowledge base may be summarized with respect to the flow chart of FIG. 11. The illustrated process 1100 is initiated by developing (1102) a parse tree that defines the subject matter of interest in terms of a number of classifications and sub-classifications. As noted above, such parsing of the subject matter may be implemented with enough levels to divide the subject matter to the desired granularity. The process 1100 then proceeds on two separate paths relating to establishing classifications for potential search terms and classifications for items from the source collection. It will be appreciated that these two paths may be executed in any order or concurrently. On the potential search term path, the process involves obtaining or developing (1104) a potential search term listing. As noted above, an existing list may be obtained, a new list may be developed by a subject matter expert, or some combination of these processes may occur. The terms are then mapped (1106) to the parse tree structure such as by a drag and drop operation on a graphical user interface as illustrated above. On the source term process line, the process 1100 proceeds by obtaining or developing (1108) a source term listing. Again, the source term listing may be obtained from existing sources, developed by subject matter expert or some combination of these processes may occur. The individual terms are then mapped (1110) to the parse tree structure, again, for example, by way of a drag and drop operation as illustrated above. Although not shown, the process 1100 may further include the steps of re-writing the potential search terms and source terms in a standardized form.

Figure 12:
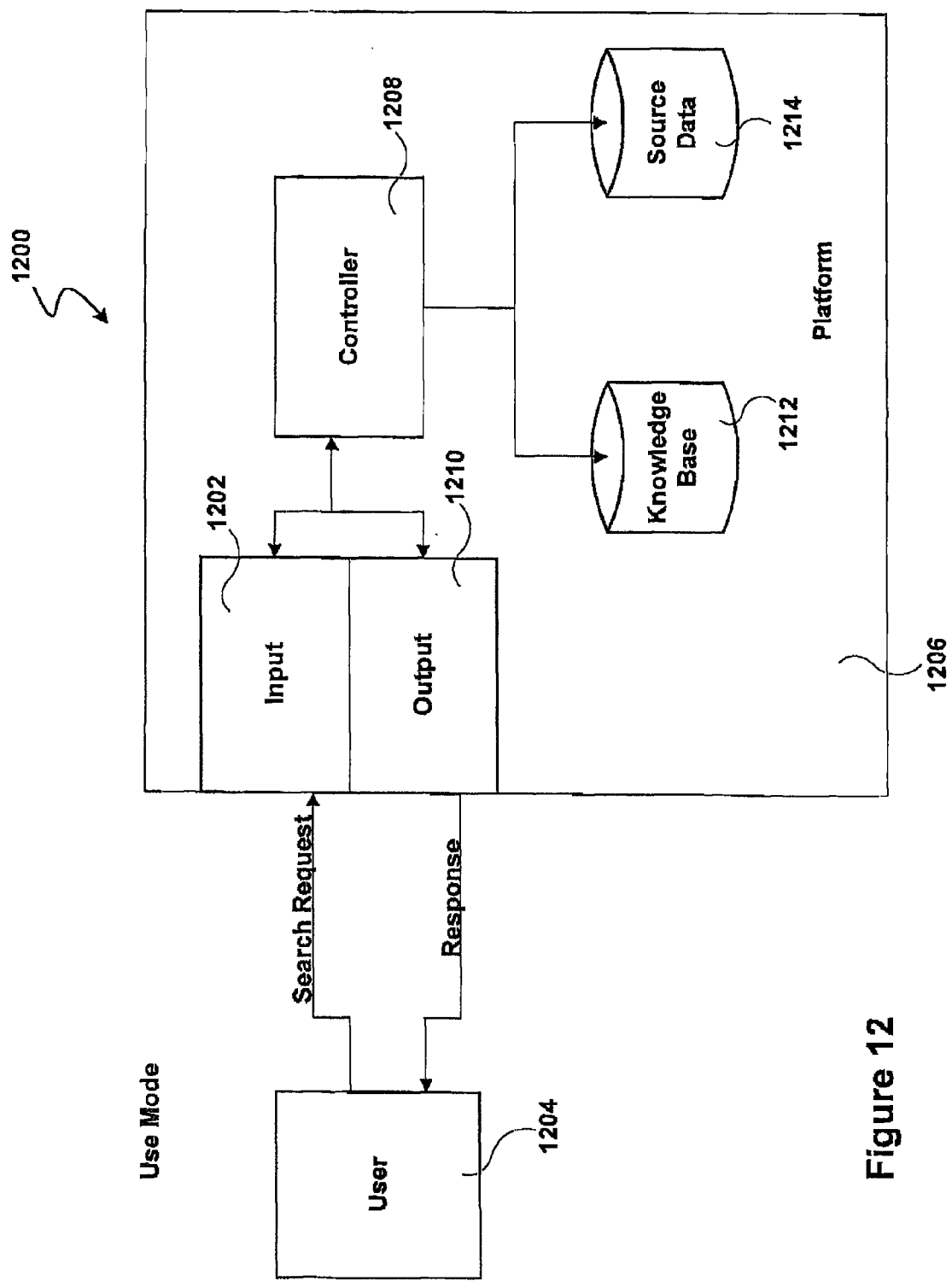
FIG. 12 is a schematic diagram illustrating a system for implementing a search application in accordance with the present invention.

The search system of the present invention is also operative in a use mode. This is illustrated in FIG. 12. The illustrated system 1200 includes input structure 1202 for receiving a search request from a user 1204. Depending on the specific network context in which the system 1200 is implemented, the search request may be entered directly at the machine executing the search system, or may be entered at a remote node interconnected to the platform 1206 via a local or wide area network. The nature of the input structure 1202 may vary accordingly. The search request is processed by a controller 1208 to obtain responsive information that is transmitted to the user 1204 via output structure 1210. Again, the nature of the output structure 1210 may vary depending on the specific network implementation.

In the illustrated implementation, in order to obtain the responsive information, the controller accesses the knowledge base 1212. The knowledge base 1212 includes stored information sufficient to identify a term from the search request, rewrite the term in a standardized form, transform the term if necessary, and obtain the metadata associated with the term that reflects the classification relationships of the term. The controller then uses the standardized term together with the classification information to access responsive information from the source data 1214.

Figure 13:
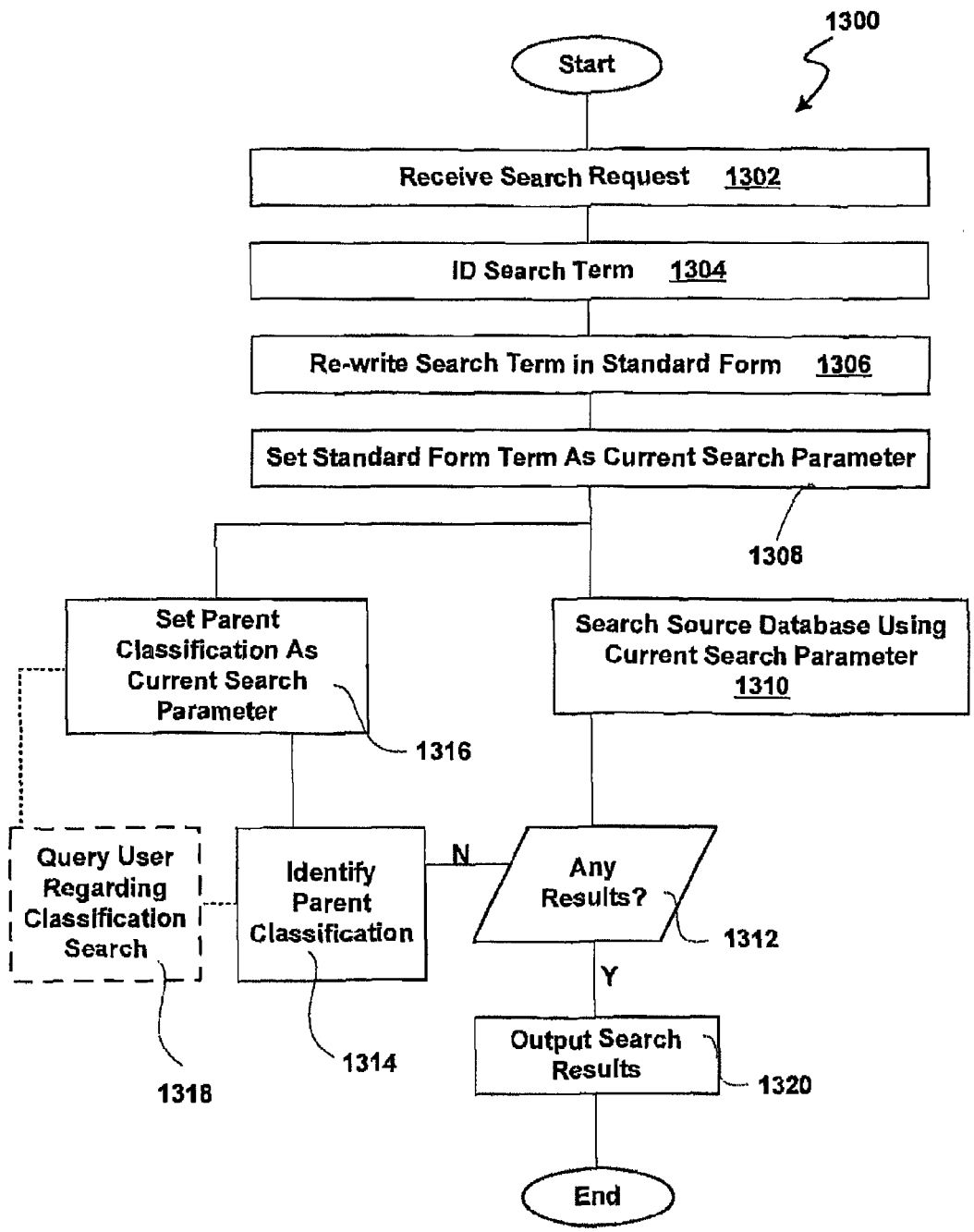
FIG. 13 is a flow chart illustrating a process that may be implemented by the system of FIG. 12.
Figure 14:
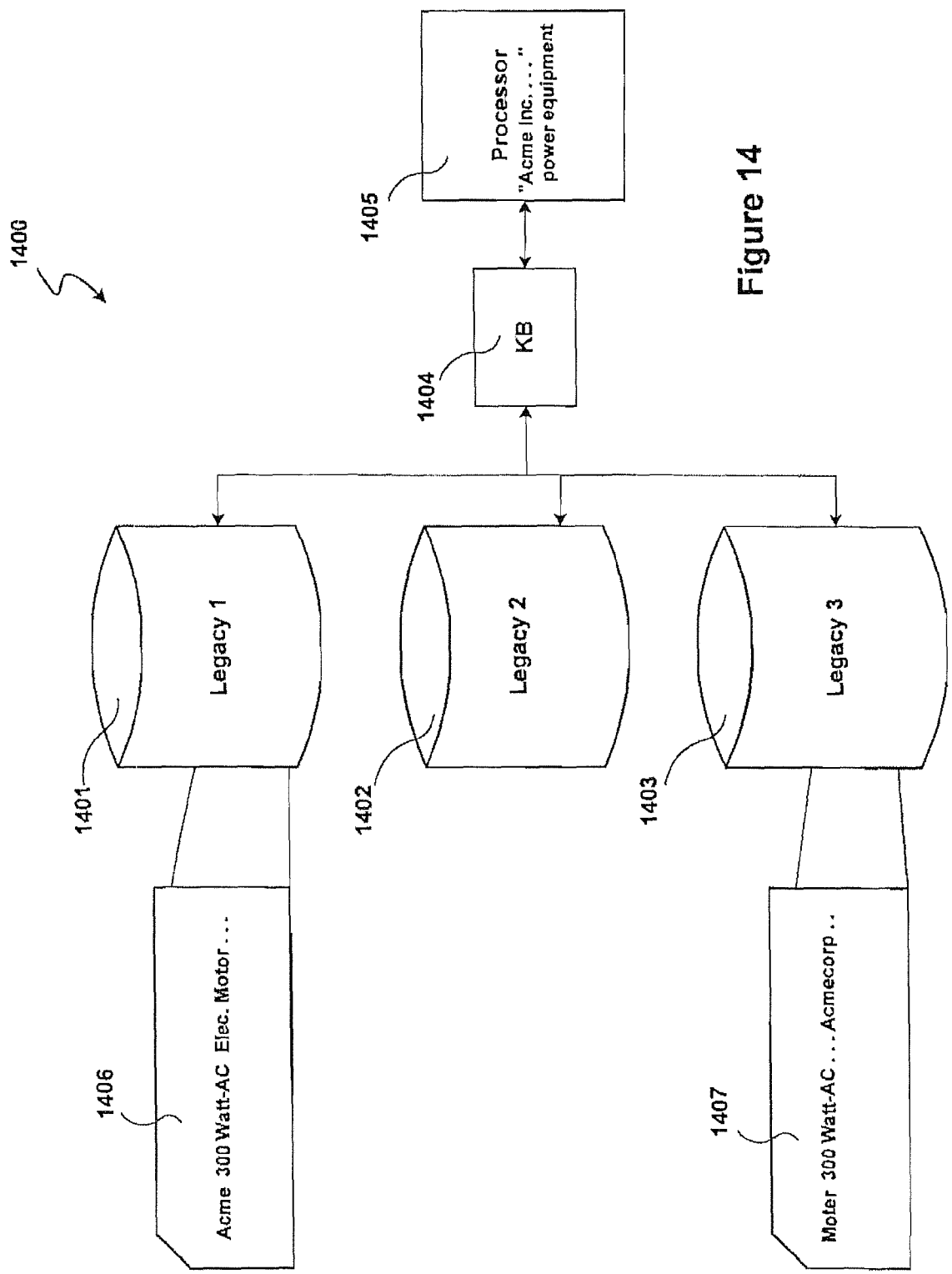
FIG. 14 is a schematic diagram illustrating a system using a knowledge base to process legacy information in accordance with the present invention.

FIG. 13 is a flow chart illustrating a corresponding process 14300. The process 100 is initiated by receiving (1302) a search request, for example, from a keyboard, graphical user interface or network port. The system is then operative to identify (1304) a search term from the search request. In this regard, any appropriate search query syntax may be supported. For example, a search term may be entered via a template including predefined Boolean operators or may be entered freeform. Existing technologies allow for identification of search terms thus entered.

The search term is then rewritten (1306) in standard form. This may involve correcting misspellings, mapping multiple synonyms to a selected standard term, implementing a predetermined syntax and grammar, etc., as will be described in more detail below. The resulting standard form term is then set (1308) as the current search parameter.

In the illustrated implementation, the search then proceeds iteratively through the hierarchy of the parse tree structure. Specifically, this is initiated by searching (1310) the source database using the current search parameter. If any results are obtained (1312) these results may be output (1320) to the user. If no results are obtained, the parent classification at the next level of the parse tree is identified (1314). That parent classification is then set (1316) as the current search parameter and the process is repeated. Optionally, the user may be queried (1318) regarding such a classification search. For example, the user may be prompted to answer a question such as "no match found—would you like to search for other products in the same classification?" In addition, the logic executed by the process controller may limit such searches to certain levels of the parse tree structure, e.g., no more than three parse levels (parent, grandparent, great grandparent) in order to avoid returning undesired results. Alternatively or additionally, such searching may be limited to a particular number of responsive items. The responsive items as presented to the user may be ordered or otherwise prioritized based on relevancy as determined in relation to proximity to the search term in the parse tree structure.

It will be appreciated that searching functionalities such as discussed above is not limited to searching of a web site or electronic catalog by outside parties but is more generally useful in a variety of searching and database merging environments. FIG. 44 illustrates a system 1400 for using a knowledge base 1404 to access information from multiple legacy databases 1401-1403. Many organizations have related information stored in a variety of legacy databases, for example, product databases and accounting databases. Those legacy databases may have been developed or populated by different individuals or otherwise include different conventions relating to linguistics and syntax.

In the illustrated example, a first record 1406 of a first legacy database 1401 reflects a particular convention for identifying a manufacturer ("Acme") and product ("300W AC Elec. Motor . . . "). Record 1407 associated with another legacy database 1403 reflects a different convention including, among other things, a different identification of the manufacturer ("AcmeCorp") and a misspelling ("Moter").

In this case, an internal or external user can use the processor 1405 to enter a substantially freeform search request, in this case "Acme Inc. Power Equipment." For example, such a search request may be entered in the hopes of retrieving all relevant information from all of the legacy databases 1401-1403. This is accommodated, in the illustrated embodiment, by processing the search request using the knowledge base 1404. The knowledge base 1404 executes functionality as discussed above and in more detail below relating to standardizing terms, associating terms with a classification structure and the like. Thus, the knowledge base 1404 may first process the search query to standardize and/or classify the search terms. For example, Acme, Inc. may be associated with the standardized term "Acme." The term polar equipment may be associated with the standardized term or classification "motor." Each of these terms/classifications may in turn be associated with associated legacy forms of the databases 1401-1403 to retrieve responsive information from each of the databases. Additional conventional functionality such as merge functionality may be implemented to identify and prioritize the responsive information provided as search results to the processor 1405. In this manner, searching or merging of legacy data systems is accommodated with minimal additional code.

From the discussion above, it will be appreciated that substantial effort is involved in transforming data from one form to another, e.g., from a raw list of potential search or source terms to a set or sets of standardized, classified and, perhaps, translated terms. The present invention also accommodates sharing information established in developing a transformation model such as a semantic metadata model (SMM) used in this regard. Such sharing of information allows multiple users to be involved in creating the knowledge base, e.g., at the same time, and allows components of such information to be utilized in starting new knowledge base creation projects. This functionality is described in detail in U.S. patent application Ser. No. 10/970,372 which is incorporated herein by reference in its entirety.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. A method for use in developing applications for manipulating data, comprising the steps of:

identifying a subject matter area of interest in relation to a desired conversion involving converting data between a first form and a second form;

accessing a knowledge base for said subject matter area, wherein said knowledge base defines associations between data items of said first form and data items of said second form, wherein said associations are specific to said subject matter area identified;

providing a user interface on a machine-based tool that allows a user to identify at least first and second desired functions to be executed with respect to one of source data or target data, said first desired function comprising a first one of data matching, data aggregation and data publishing and said second function comprising a second one of data matching, data aggregation and data publishing different than said first one of data matching, data aggregation and data publishing, wherein said first and second desired functions collectively define an application related to a defined business purpose in addition to the converting of data between the first form and the second form; and first operating a machine-based tool to use the knowledge base to generate logic based at least partially on said associations for performing said first desired function with respect to said subject matter area; and second operating said machine based tool to use the knowledge base to generate logic based at least partially on said associations for performing said second desired function with respect to said subject matter area.

2. A method as set forth in claim 1, wherein said step of accessing comprises selecting a set of rules for use in converting said data between said first form and said second form.

3. A method as set forth in claim 1, wherein said knowledge base includes rules for one of normalizing terminology, resolving transformation ambiguities and classifying terms relating to said subject matter area of interest.

4. A method as set forth in claim 1, further comprising the steps of using said user interface to select an application adaptable conversion module, where said module includes rules for use in converting data between said first form and said second form, said module being application adaptable in that said rules function independent of any purpose specific to a particular application beyond said conversion, and purposing said selected module for use in performing said first desired function with respect to said subject matter area.

5. A method as set forth in claim 4, wherein said step of using comprises associating said application adaptable module with a source of input information such that said first module operates to convert at least a portion of said input information between said first and second forms.

6. A method as set forth in claim 4, wherein said step of using comprises associating said module with a second module such that said first and second modules cooperate to perform steps related to said desired function.

7. A method for use in developing multiple applications involving transformations of data between a first form and a second form, said multiple applications having different purposes, the method comprising the steps of:

providing a set of application adaptable conversion modules, wherein each said module includes rules for use in converting data objects between said first form and said second form, wherein each application module is adaptable in that said rules function independent of any purpose specific to a particular application beyond said conversion;

selecting two or more of said conversion modules and purposing said selected conversion models for use a desired purpose comprising at least one of data matching, data aggregation and data publishing, said two or more conversation modules comprising an application, wherein said desired purpose relates to a defined business purpose in addition to the converting of data between the first form and the second form;

first identifying a first subject matter area of interest in relation to said desired purpose; first accessing a first knowledge base for said first subject matter area, wherein said first knowledge base defines first associations between data items of said first form and data items of said second form, wherein said first associations are specific to said first subject matter area identified;

first operating a machine-based tool to use said first knowledge base to generate logic specific to said first subject matter area for at least one of said two or more of said conversion modules of said application;

second identifying a second subject matter area of interest in relation to said purposing, wherein said second subject matter is different than said first subject matter;

second accessing a second knowledge base for said second subject matter area, wherein said second knowledge base defines second associations between data items of said first form and data items of said second form, wherein said second associations are specific to said second subject matter area identified; and second operating a machine-based tool to use said second knowledge base to generate logic specific to said second subject matter area for at least one of said two or more of said conversion modules of said application.

8. A method as set forth in claim 7, wherein said first subject matter area pertains to a first defined business product area and said second subject matter area pertains to a second defined business product area.

9. A method as set forth in claim 7, wherein said step of first operating comprises associating said application with a source of input information such that said application operates to convert at least a portion of said input information between said first and second forms.

10. A method as set forth in claim 7, wherein said first accessing and said second accessing comprise selecting a first set of rules specific to said first subject matter area and a second set of rules specific to said second subject matter area, respectively, for use in converting said data between said first form and said second form.

11. A method as set forth in claim 7, wherein said first knowledge base and said second knowledge base include rules for one of normalizing terminology, resolving transformation ambiguities and classifying terms relating to said first and second subject matter area of interest, respectively.

12. A method as set forth in claim 7, wherein said two or more conversion modules of said application cooperate to perform steps related to said desired purpose.

\* \* \* \* \*

UNITED STATES PATENT AND TRADEMARK OFFICE
CERTIFICATE OF CORRECTION

| | | |
|---|---|---|
| PATENT NO. | : 8,627,208 B2 | Page 1 of 1 |
| APPLICATION NO. | : 13/080500 | |
| DATED | : January 7, 2014 | |
| INVENTOR(S) | : Rivas et al. | |

It is certified that error appears in the above-identified patent and that said Letters Patent is hereby corrected as shown below:

Title Page, Item (57), abstract, line 13-16, after "application." delete "In this manner, an application is generated from a number of generic modules simply by linking the modules to perform a purpose of the desired application.".

In the Drawings

On sheet 4 of 18, in figure 4, under reference numeral 413, line 3, delete "MILIMETER" and insert -- MILLIMETER --, therefor.

In the Specification

In column 5, line 23, delete "invention; and" and insert -- invention; --, therefor.

In column 13, line 67, delete "the—entirety" and insert -- the entirety --, therefor.

In column 14, line 43, delete "if executed" and insert -- is executed --, therefor.

In column 16, line 8, delete "patent" and insert -- parent --, therefor.

In column 18, line 35, delete "3700" and insert -- 700 --, therefor.

In column 19, line 36, delete "3706." and insert -- 706. --, therefor.

In column 19, line 39, delete "3708" and insert -- 708 --, therefor.

Figure 8:
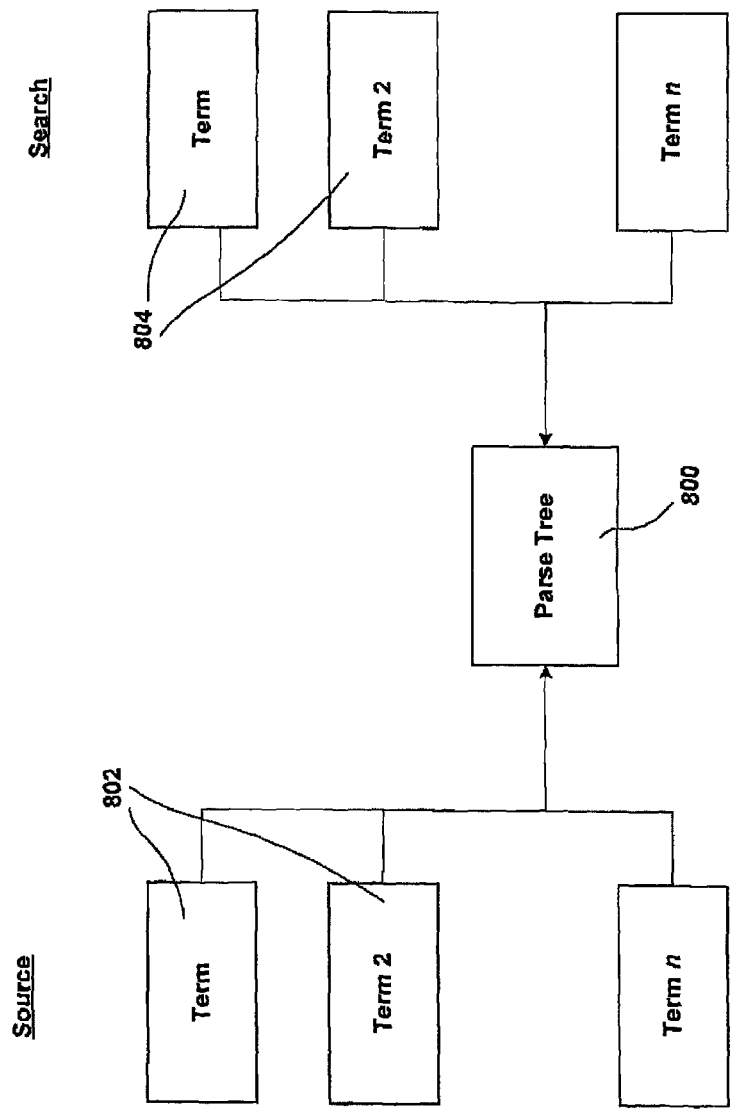
FIG. 8 is a schematic diagram illustrating a search application implemented in accordance with the present invention.

In column 19, line 44, delete "FIG. 88." and insert -- FIG. 8. --, therefor.

In column 21, line 19, delete "14300." and insert -- 1300. --, therefor.

Signed and Sealed this
Fifteenth Day of July, 2014

Michelle K. Lee
*Deputy Director of the United States Patent and Trademark Office*